United States Patent Office 3,412,036
Patented Nov. 19, 1968

3,412,036
SYNTHETIC RESIN AND PIGMENT
PRODUCTION
Maurice Dwight McIntosh, Willoughby, Ohio, assignor to Switzer Brothers, Inc., Cleveland, Ohio, a corporation of Ohio
No Drawing. Continuation-in-part of application Ser. No. 196,860, May 21, 1962. This application Sept. 28, 1966, Ser. No. 582,511
80 Claims. (Cl. 252—301.2)

ABSTRACT OF THE DISCLOSURE

This invention relates to the production of pigment resin cocondensates of (a) formaldehyde and (b) heterocyclic molecules each having a plurality of reactive intracyclic —NH— groups, in combination with (c) heterocyclic molecules each having a plurality of reactive exocyclic —$NH_2$ groups and/or with (d) aromatic sulfonamide molecules each having two reactive amide hydrogens, i.e., to the methods of producing and also the resultant resins, colored pigments per se, and colored compositions containing such pigments (from the cocondensates (a) (b) (c), (a) (b) (c) (d), and/or (a) (b) (d) defining the pigment resin matrices).

This invention relates to synthetic resin pigment production. This is a continuation-in-part based on my sole application Ser. No. 196,860, filed May 21, 1962, now abandoned, and attention is also directed to prior applications Ser. No. 70,927, filed Nov. 20, 1960 (and now abandoned); Ser. No. 274,791, filed Apr. 22, 1963, now abandoned; and Ser. No. 291,272, filed June 28, 1963, said last three applications being filed jointly in my name and that of Zenon Kazenas and Joseph Lyman Switzer and disclosing in part certain of the pigments hereof, although claiming subject matter separate and distinct from that here claimed.

The instant synthetic resin pigments, particularly in thermoplastic forms, have been found to be particularly good dye carriers (especially with the so-called "daylight fluorescent" dyes). Certain of the instant synthetic resinous pigments have been found to have unusual heat stability and/or resistance to aging and/or weathering. The resins used herein may be colored with suitable coloring material such as dyestuffs and/or pigments (fluorescent or nonfluoroescent) and these resins have been found to provide unusual advantages in ability to disperse the coloring material employed, ability to afford heat stability and/or aging resistance in colored pigments made therefrom, ability to provide improved and/or prolonged color effects in certain embodiments of the instant pigments, etc. It has also been found that the resinous pigments of the instant invention have unusual compatibility with other resins (e.g., polyethylene resins).

It is, therefore, an important object of the instant invention to provide an improved pigment formed from an improved synthetic resin and an improved method of producing pigments.

Other and further objects, features and advantages of the present invention will become apparent to those skilled in the art from the following detailed description thereof.

The instant invention consists in a pigment made from a cocondensation product of (a) formaldehyde; (b) at least one heterocyclic resin-former whose molecule has a plurality of intracyclic —NH— groups each connected to a carbon atom in a heterocyclic ring, such carbon atom being in turn connected to an oxygen atom by a double bond, and such heterocyclic ring consisting of carbon and nitrogen atoms; preferably plus (c) at least one substance whose molecule has a plurality of $NH_2$ groups each connected to a carbon atom in a heterocyclic ring, such carbon atom being in turn connected to an intracyclic nitrogen atom by a double bond, and such heterocyclic ring consisting of carbon and nitrogen atoms; and (d) which is an aromatic monosulfonamide having two reactive hydrogens (i.e., reactive amide H's or those H's attached to the amide N). The molar ratio of (a):(b) plus (c) and/or (d) ranges from 2:1 to 1:2 and the molar ratio of (c):(b) ranges from 1:20 to 20:1. The instant invention thus contemplates the use of pigment cocondensates of (a) (b) (c) and (a) (b) (d) as well as (a) (b) (c) (d), it being understood that, as used herein, ingredient (c) is different chemically from (b). The instant invention also consists in the improved method of producing the foregoing resin and using the same as a pigment matrix for carrying coloring material, and also in the resulting finely divided pigment particles formed therefrom.

Zenon Kazenas U.S. Patents Nos. 2,809,954 and 2,938,873, describe certain cocondensates of (a), (c) and (d); whereas the instant resins are cocondensates of (a), (b) and (d), and/or optionally (c), that are used in the formation of pigments having particularly useful properties.

First of all, one of the ingredients used in the instant cocondensation reaction is the formaldehyde component (a), which may be formaldehyde or any derivative thereof such as paraformaldehyde, hexamethylene tetramine, or the like; or any formaldehyde donor such as, for example, trimethylol melamine, which might be used in a resin of the invention to contribute for the cocondensation reaction a formaldehyde component (a) as well as what will be described in detail hereinafter as a heterocyclic poly $NH_2$ ingredient (c). For the sake of simplifying this disclosure, it will be appreciated that from whatever source it may come, one of the essential ingredients in the instant cocondensate production is formaldehyde, and this essential ingredient will be referred to hereinafter merely as "formaldehyde" or ingredient "(a)." The remaining ingredients (b), (c) and (d) which will be described in detail hereinafter, will be referred to essentially as the individual resin forming molecule (or mixture of such molecules) although it will be understood that in the case of any of these ingredients (b), (c) and/or (d), the ingredient (a), namely, formaldehyde, may have been reacted with such resin former and the reaction product introduced as such into the cocondensation reaction in the manner described in further detail hereinafter. In other words, the essential ingredients in the form of formaldehyde per se and the resin forming molecules per se, will be described as ingredients (a), (b), (c) and (d) as such hereinafter, purely for the purposes of simplifying the instant disclosure.

One of the materials essential to the practice of the instant invention is referred to herein as ingredient (b). Ingredient (b) is often (but not always) a thermoplastic resin former when condensed by itself with the formaldehyde component (a). In fact, the condensation product of (a) formaldehyde and (b) dimethyl hydantoin is a known thermoplastic resin, described in the literature. Many of the other condensation products of formaldehyde and the materials to ingredient (b) are new thermoplastic resins. The present invention is, however, directed to pigments formed of cocondensation products of (a) formaldehyde with ingredient (b) and ingredients (d) and/or (c). In this respect, a pigment cocondensate of ingredients (a) with (b) and (c) and/or (d) is a reaction product in which the resinous body or matrix involves substantially coreaction of formaldehyde (a) with each of the plurality of resin formers (b) and (c) and/or (d)

to form an integral resinous cocondensate, as contrasted to a mixture of "homo-condensates" of (a) and (b), (a) with (c) and (a) with (d). Substantially complete cocondensation, which is the desired result, means that the entire resin body is a substantially integral, complex resin molecular structure in which substantially all of the coreactants (a), (b), (c) and (d) are united and there is a substantial absence of "homo-condensates" of formaldehyde with any of the individual ingredients such as (b), which are merely admixed with the main resinous body.

As indicated previously, the ingredient (b) is a resin former with formaldehyde. Preferred compounds for use in the invention as ingredient (b) are the imidazolidinediones, or hydantoins, typical members of which compounds include.

(I) Hydantoin

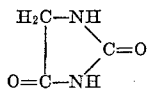

(II) Dimethyl hydantoin

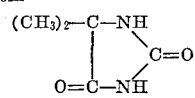

(III) Methyl isobutyl hydantoin

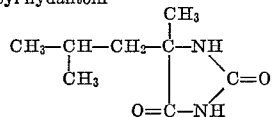

(IV) Phenyl hydantoin

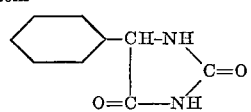

(V) Benzyl hydantoin

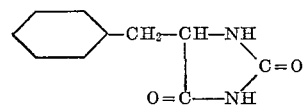

(Va) Methyl hydantoin

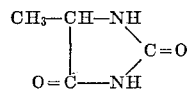

(Vb) Methyl phenyl hydantoin

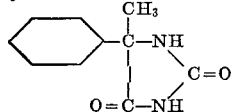

(Vc) Methyl (-methoxy)- isopropyl hydantoin

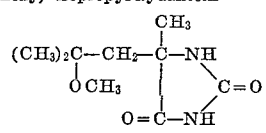

(Vd) Ethyl phenyl hydantoin

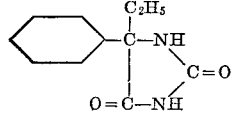

(Ve) Ethoxy-phenyl hydantoin

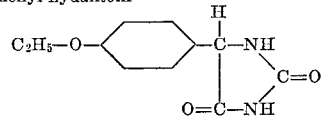

(VI) Methoxy-phenyl hydantoin

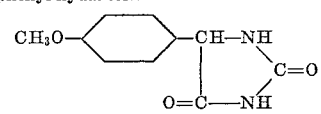

(VII) Isopropyl-phenyl hydantoin

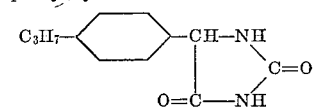

(VIII) Cyclohexyl hydantoin

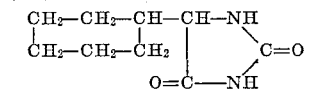

(IX) Methoxy-benzyl hydantoin

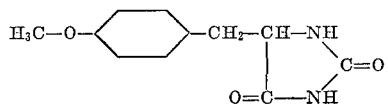

(X) Isopropyl-benzyl hydantoin

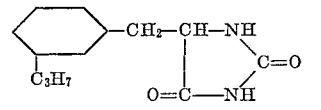

(XI) Benzyl methyl hydantoin

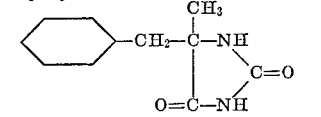

(XII) Methylcyclohexyl hydantoin

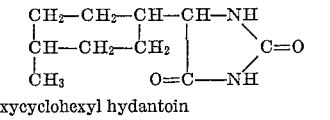

(XIII) Methoxycyclohexyl hydantoin

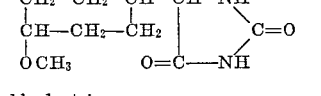

(XIV) Diphenyl hydantoin

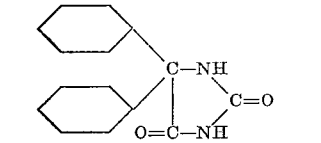

(XV) Phenyl benzyl hydantoin

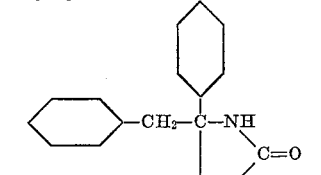

(XVI) Phenyl cyclohexyl hydantoin

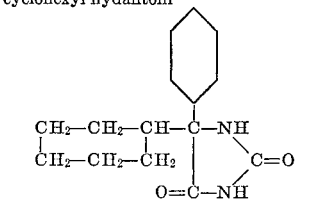

Hydantoin (I) and dimethyl hydantoin (II) are well known and available commercially. Other substituted hydantoins are known and/or readily prepared by the process of Bergs German Patent No. 566,094 (December 1932). In general, any aldehyde or ketone may be used as a starting material. An aldehyde yields a mono-substituted hydantoin. A ketone yields a disubstituted hydantoin. Cyclic ketones carrying the keto groups as part of the ring form spiro-hydantoins.

In general, the preferred imidazolidinedione for use as ingredient (b) has the following formula:

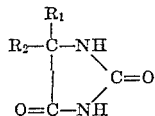

wherein $R_1$ and $R_2$ are H, alkyl, aralkyl, aryl or together represent a divalent alkylene (spiro) radical; and most preferably each $R_1$ and $R_2$ is selected from the group consisting of H, $C_1$–$C_4$ alkyl, phenyl, benzyl, and cyclohexyl radicals in which the only substituents on the phenyl, benzyl and cyclohexyl rings are $C_1$–$C_4$ alkyl and $C_1$–$C_4$ alkoxy.

In general, however, compounds which may be used in the practice of the invention as ingredient (b) comprise a compound which is a resin-former with formaldehyde and whose molecule contains (1) a five-membered ring in which there are at least two nuclear N atoms each having one H atom attached thereto and being attached to a nuclear carbonyl group, (2) at least two nuclear C atoms and (3) only N and C nuclear atoms in said ring. Preferably, also, the compound has only substituents on said ring that are inert to formaldehyde and consist of no atoms other than C, H, halo and ether, hydroxy and/or keto O atoms. Expressed in other terms the molecule has a plurality of —NH— groups each connected to a carbon atom in a heterocyclic five-membered ring, such carbon atom being in turn connected to an oxygen atom by a double bond, and such heterocyclic ring being a five-membered ring consisting of carbon and nitrogen atoms.

Still another class of compounds (b) useful in the practice of the invention which (like the hydantoins) contain a plurality of both keto and imido groups are known as the urazols, having the general formula:

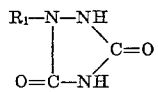

(XXVIa) Urazole

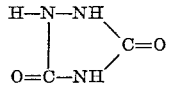

(XXVIb) 1-phenyl urazol

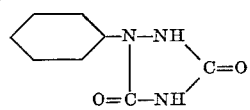

(XXVIc) p-chloro-phenyl urazol

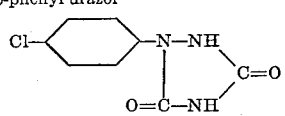

(XXVId) p-methyl-phenyl urazol

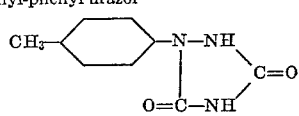

Other compounds useful as ingredient (b) include other members of the keto-imidazolidine family, such as:

(XVII) Imidazolidinetrione (parabamic acid)

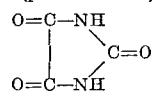

(XVIII) Imidazolone

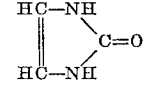

(XIX) Imidazolidone (ethylene urea)

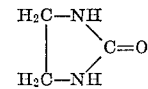

(XIXa) Dihydroxy imidazolone (dihydroxy ethylene urea)

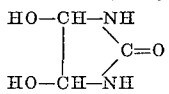

(XX) Benzimidazolone (phenylene urea)

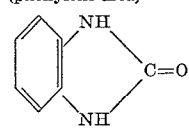

(XXI) 4,5-tetramethylene imidazolidone

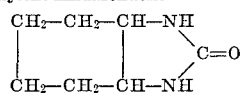

(XXII) 5,5-pentamethylene hydantoin [1]

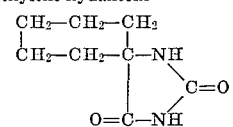

[1] (Made by Bergs' process starting with cyclohexanone)

(XXIII) Phenyl imidazolone

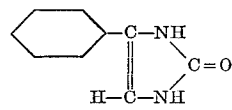

(XXIV) Phenyl imidazolidone

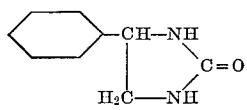

(XXV) Isopropyl imidazolidone

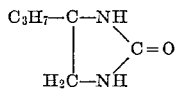

(XXVI) Diphenyl imidazolidone

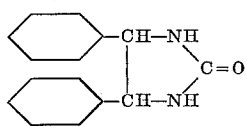

It will thus be seen that such compounds include compounds having in their molecule a five-membered nucleus composed of two intracyclic —NH— groups, one intracyclic carbonyl group therebetween and two remaining intracyclic C atoms, which two remaining atoms have substituents which are inert to formaldehyde in the resin forming reaction. Such substituents include $R_1$ and $R_2$ (previously defined) and also carbonyl, hydroxy or ether O atoms, phenyl and cyclohexane rings fused with the five-membered ring and the cyclic pentamethylene radical and other cyclic aliphatic bivalent radicals. All of such radicals are inert toward formaldehyde in the resin forming or cocondensation reaction of the invention, and need not be described in further detail since skilled resin chemists recognize this general class of radicals as being inert in this respect.

Also, included in the definition of ingredient (b) is a compound having the previously defined heterocyclic ring (with the two —NH— groups on either side of an intracyclic nuclear carbonyl group in a five-membered ring) where one of the atoms in the heterocyclic ring is C and the other is N.

Typical compounds of this class include (XXVIa)–(XXVId) and:

(XXVII) Triazolone

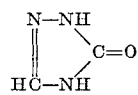

(XXVIII) Triazolidone

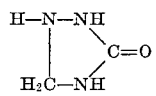

The substituted triazolidones have the general formula:

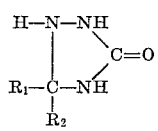

wherein $R_1$ and $R_2$ have the previously described definition in column 5.

As previously indicated herein, the ingredient (b) may contain a plurality of rings, e.g., two rings in Compounds VI through XIII, three rings in Compounds XIV through XVI, etc., including fused ring structures (XX), (XXI), etc. It will also be understood that preferably the molecule has a plurality of intracyclic —CO— groups in heterocyclic ring structures of ingredient (b); and also there may be more than two intracyclic —NH— groups attached to an intracyclic —CO— group of a heterocyclic ring, as in the case of (XXVIa) urazole. Moreover, certain unique advantages of the invention are obtained using, in or for ingredient (b), compounds of a certain group having the previously defined plurality of —NH— groups and having a plurality of the previously defined intracyclic —CO— groups as well as a plurality of the previously defined heterocyclic groups. Such compounds preferably include those which may be referred to as the poly-ureido group, with the parent compound being:

(XXIX) Acetylene urea (acetylene diurein or diureine, or glycoluril, or acetylene diurea):

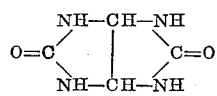

wherein it will be seen there are a plurality of intracyclic —NH— groups, each attached to an intracyclic —CO— group in a heterocyclic ring, with the Compound XXIX containing a plurality of such —CO— groups as well as a plurality of such heterocyclic rings, in a fused ring structure. Acetylene urea (or diurea) is available commercially.

The bivalent —NH—CO—NH— group is referred to as the ureido (or carbamido) group. Certain of these compounds and their preparation are disclosed in Beilstein among other sources. In general, Compound XXIX may be prepared by reaction of 1 mol of glyoxal with 2 mols of urea, perhaps along the lines of the following proposed reaction scheme (AA):

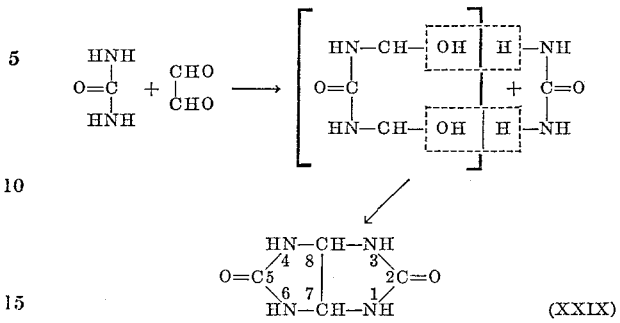

(XXIX)

The compound shown in brackets is merely proposed as a material which may or may not exist or may exist only in a transitory stage in such reaction scheme. Although it is not intended to limit the invention to any particular theory, the foregoing reaction scheme is helpful in connection with the synthesis of the compounds of this group. For example, prior reaction of urea with formaldehyde to obtain dimethylol urea for reaction with glyoxal seems to be helpful in tying up one reactive H on each amido N so that the cyclic ureido compound appears to be more easily formed as an intermediate, again presumably along the following reaction scheme (BB):

(XXIXa)

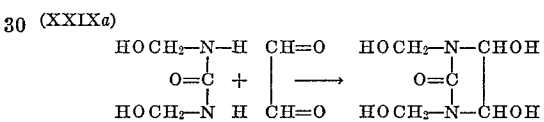

In the foregoing product (XXIXa) of scheme (BB), i.e., 1,3-dimethylol-4,5-dihydroxy-ethylene urea, it will be appreciated that the hydroxy groups are essentially inert or nonreactive vis-a-vis formaldehyde and are thus also included in the previously recited definitions of essentially inert carbonyl and alkoxy radicals containing O, e.g., in $R_1$ and $R_2$. Still other compounds of the poly-ureido group that may be used in the practice of the invention include:

(XXIXb) 7,8-d methyl acetylene urea

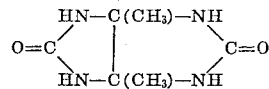

(XXIXc) 1,4-dimethyl acetylene urea, from N-methyl urea, obtained mixed with (XXIXd)

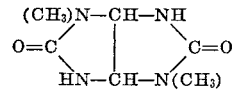

(XXIXd) 1,6-dimethyl acetylene urea, from N-methyl urea obtained mixed with (XXIXc)

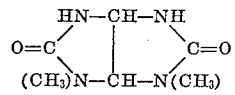

(XXIXe) 4,6-dimethyl-4,6-ureido-propylene urea

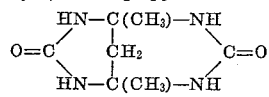

Beilstein suggests that in the preparation of the foregoing it is preferable to prepare the corresponding thiourea or thioureido compound and then hydrolyze to the corresponding urea or ureido; hence (XXIXb) is made via reaction between dimethyl glyoxal and thiourea; (XXIXc) and (XXIXd) are made, as an initial mixture, via reaction between glyoxal and monomethyl thiourea; (XXIXe) is made via reaction between acetylacetone and thiourea, and so forth. The following compounds may also be prepared accordingly and used in the invention:

(XXIXf) 1,4-diethyl acetylene urea (in mix with 1,6 isomer)

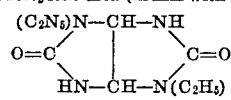

(XXIXg) 1,6-dibutyl acetylene urea (in mix with 1,4 isomer)

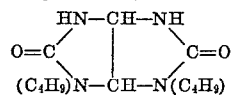

(XXIXh) 1-ethyl acetylene urea

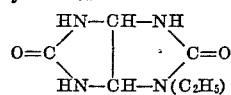

via initial mol for mol reaction of glyoxal and ethyl urea, followed by reaction with one mol of urea (or with thiourea counterparts).

(XXIXs) 1,6-(di-2-chlorethyl)acetylene urea (in mix with 1,4 isomer)

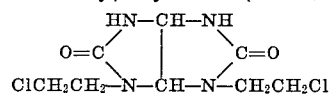

Using N-(2-chlorethyl)urea.

(XXIXi) 1,4-di-(2-methoxyethyl)acetylene urea (in mix with 1,6-isomer)

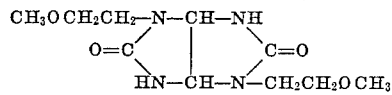

Starting with N-(2-methoxyethyl)urea.

(XXIXj) 1-acetyl acetylene urea

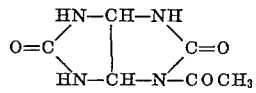

From acetyl urea, per reaction system for (XXIXh)

(XXIXk) 1,6-di-(2-carbethoxyethyl) acetylene urea (in mix with 1,4 isomer)

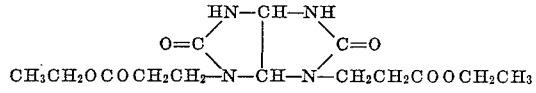

From N-(2-carbethoxyethyl) urea.

(XXIXm) 7-phenyl acetylene urea

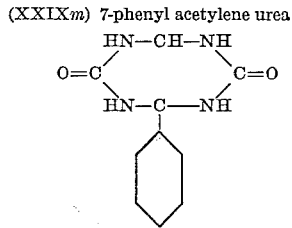

From phenyl glyoxal.

(XXIXn) 7-methyl acetylene urea

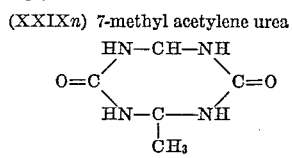

From methyl glyoxal.

The corresponding propyl compound is made from propyl glyoxal.

(XXIXq) 7-methyl-8-ethyl acetylene urea

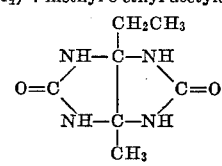

From methyl ethyl glyoxal.

(XXIXr) 7-methyl-8-amyl acetylene urea

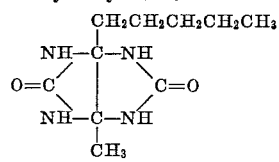

From methyl amyl glyoxal.

(XXIXu) 7-methyl-8-cyclohexyl acetylene urea

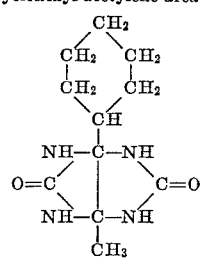

From methyl cyclohexyl glyoxal.

(XXIXt) 7-methyl-8-sec.-butyl acetylene urea

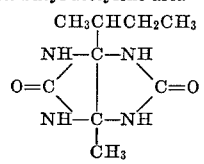

From methyl sec.-butyl glyoxal.

(XXIXo) Bis-(7-methylene-acetylene urea)

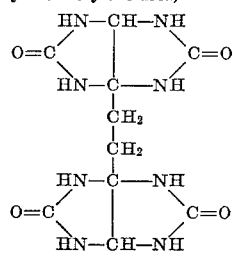

From diglyoxyl ethane with a total of four mols of urea.

As will be appreciated, a mixture of compounds meeting the definition of each of the ingredients (b), (c) and/or (d) may be used, instead of a single compound, hence the terminology "at least one" that is used in the claims hereof.

The ingredient (c) as used herein is normally considered to be a thermosetting resin former, i.e., a substance or compound (c) whose molecule has a plurality of $NH_2$ groups each connected to a carbon atom in a heterocyclic ring, said carbon atom being connected by a double bond to an intracyclic nitrogen atom. Such compound (c) may be hereinafter referred to as a "heterocyclic polyamine" and the heterocyclic rings involved include triazole, diazine and triazine rings. The compound (c) includes:

(XXX) Guanazole

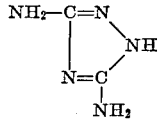

(XXXI) 1-phenyl guanazole

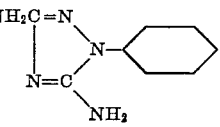

(XXXII) 4-aminoguanazole

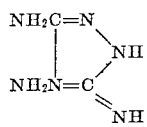

(XXXIII) 1-carbamyl guanazole

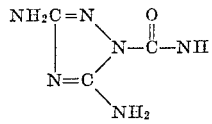

(XXXIV) 1-guanyl guanazole

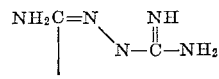

(XXXV) 1-acetyl guanazole

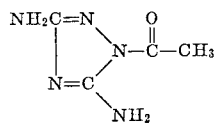

or (XXXVI) 1-benzoyl guanazole

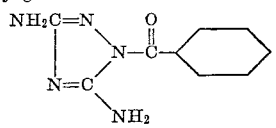

When the heterocyclic ring in a heterocyclic polyamine used in the practice of the invention comprises a diazine ring, the heterocyclic polyamine may be, e.g., a pyrimidine such as 2,4-diamino-6-hydroxy pyrimidine (XXXVII),

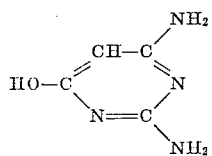

When the heterocyclic ring in a polyamine used in the practice of the invention comprises a triazine ring, the heterocyclic polyamine may be a substance whose molecule contains from one to three triazine rings, and has no reactive groups other than the amino groups. The term "reactive group" as used herein means any radical in a molecule of such a substance which may enter into undesirable side reactions that interfere with the reaction of formaldehyde with the amino triazine in the production of compositions of the invention (e.g., an OH group attached to a triazine ring may react with formaldehyde during the production of a thermosetting amino triazine-formaldehyde condensation product). A heterocyclic polyamine used in the practice of the invention that has one triazine ring in its molecule may be (1) a triamino triazine e.g., melamine (XXXVIII),

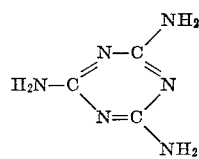

or a diamino triazine (i.e., a monoguanamine) having the general formula

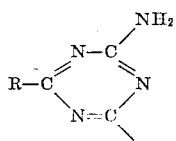

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or unsaturated cycloaliphatic hydrocarbon radical, or any of the foregoing radicals containing substituents such as aliphatic, cycloaliphatic, aromatic, alkoxy, aryloxy and acyl radicals. Thus, the monoguanamines used may have varying structures and may be of complex structure so long as they do not contain groups which interfere with the condensation reaction of formaldehyde with amino groups in the guanamine in the practice of the invention. Such monoguanamines include:

(XXXIX) Formoguanamine

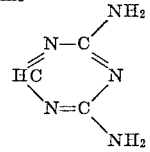

(XL) Acetoguanamine

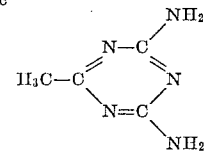

(XLI) Propioguanamine

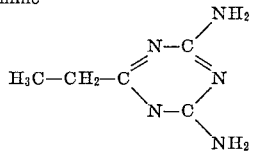

(XLII) Butyroguanamine

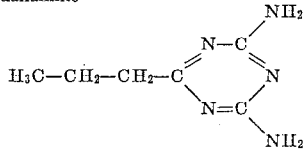

(XLIII) Benzoguanamine

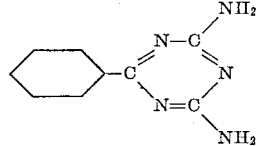

(XLIV) Phenylacetoguanamine

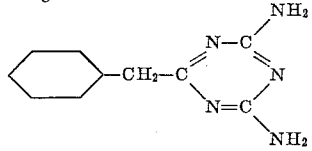

(XLV) Delta-cyano-valeroguanamine

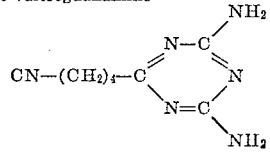

and monoguanamines obtained from the corresponding mononitriles containing as many as 18 carbon atoms, e.g., dodecano-, tetradecano-, or octadecano-nitrile.

A heterocyclic polyamine used in the practice of the invention that has two triazine rings in its molecule may be a diguanamine having the general formula.

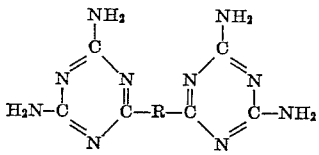

wherein R is a divalent hydrocarbon radical in which the shortest connection between the free valences is not more than 18 carbon atoms in series and which contains no substituents or contains substituents such as aliphatic, cycloaliphatic, aromatic, alkoxy, aryloxy and acyl radicals, or may be a compound having said general formula that is substituted on not more than two exocyclic nitrogen atoms, the substituents consisting of (a') not more than two monovalent aliphatic hydrocarbon radicals on each substituted nitrogen atom, each having not more than four carbon atoms, each having at least one hydrogen atom attached to the same carbon atoms as the free valence, and each having not more than one unsaturation, any such unsaturation being an olefinic unsaturation in the beta-gamma position, (b') not more than one monovalent radical of the benzene series on each substituted nitrogen atom having not more than 8 carbon atoms in which the free valence is connected to the nucleus, and (c') not more than 1 mono-alkoxy phenyl radical on each substituted nitrogen atom having not more than 8 carbon atoms. Thus the diguanamines used may have varying structures and may be of complex structure so long as they do not contain groups which interfere with the condensation reaction of formaldehyde with the diguanamine in the practice of the invention. Such diguanamines include gamma-methyl-gamma-acetyl pimeloguanamine (XLVI), wherein R above is:

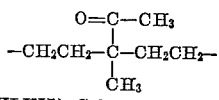

(XLVII) Sebacoguanamine

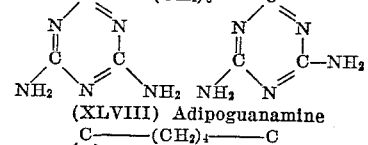

(XLVIII) Adipoguanamine

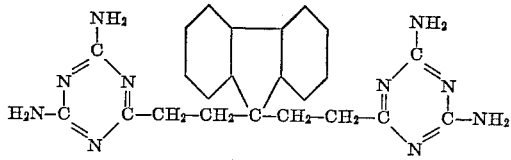

(XLIX) bis-(4,6-diamino-2-triazinyl-ethyl) fluorene

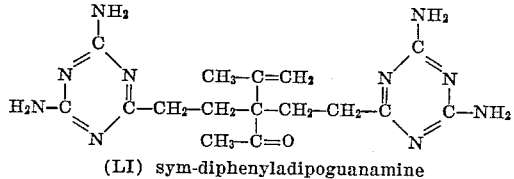

(L) Gamma-isopropenyl-gamma-acetyl pimeloguanamine

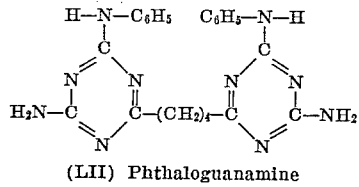

(LI) sym-diphenyladipoguanamine

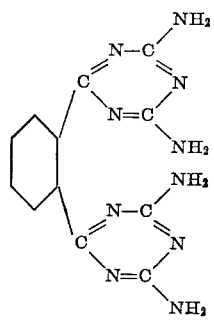

(LII) Phthaloguanamine

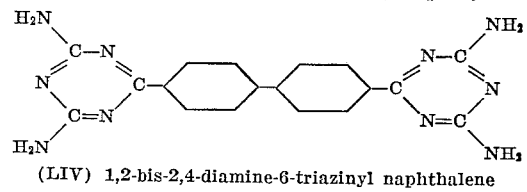

(LIII) p,p'-bis-2,4-diamino-6-triazinyl diphenyl

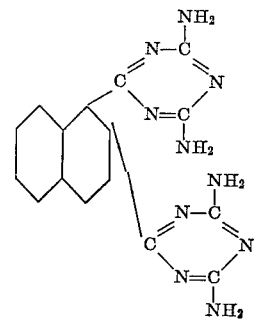

(LIV) 1,2-bis-2,4-diamino-6-triazinyl naphthalene sym.-diphenylsebacoguanamine, sym.-di-p-phenethyladipoguanamine, sym.-di-o-tolyladipoguanamine, terephthaloguanamine and diguanamines obtained from nitriles such as 2,4-dicyanodiphenyl, 4,4'-dicyanodiphenyl methane, 4,4'-dicyanodiphenyl ethane, and 4,4'-dicyanoalpha, gamma-diphenyl propane.

A heterocyclic polyamine used in the practice of the invention that has three triazine rings in its molecule may be a triguanamine such as gamma-2,4-diamino-6-triazinyl-gamma-phenyl-pimeloguanamine (LV):

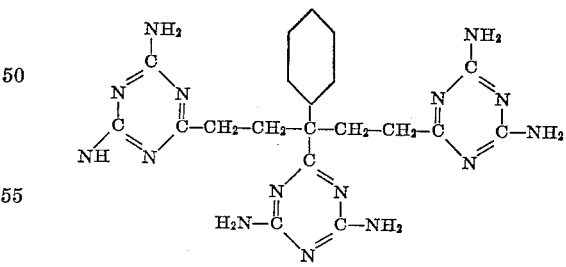

A guanamine which contains one or a plurality of 2,4-diamino-6-triazinyl radicals (e.g., a monoguamine, diguanamine or triguanamine) may be prepared by condensing the corresponding mononitrile, dinitrile or trinitrile with dicyandiamide. The nitrile which reacts with the dicyandiamide must be a specific type of nitrile, namely, a nitrile whose molecule contains a cyano radical attached to a saturated carbon atom. In other words, the carbon atoms to which the cyano group is attached must not be unsaturated and must not become unsaturated under the reaction conditions. In a nitrile used in a reaction with dicyandiamide as described herein, a nuclear carbon atom in an aromatic ring structure (e.g., an atom in an benzene nucleus) is considered to be saturated.

A mononitrile or polynitrile which may be used in the preparation of a guanamine for use in the present invention may be the nitrile corresponding to a monocarboxylic acid or a polycarboxylic acid, for example, any normal aliphatic carboxylic acid in the series from acetic acid to octadecanoic acid, or in the series from malonic acid to octadecane 1,18-dicarboxylic acid, any benzene carboxylic acid, or an aromatic carboxylic acid containing two condensed benzene nuclei or two benzene nuclei connected directly or connected by from one to twelve atoms in series, a saturated or unsaturated alicyclic carboxylic acid, the dimer of linoleic acid, or an acid obtained by substituting in the molecule of any of the foregoing acids substituents such as aliphatic, cycloaliphatic, aromatic, alkoxy, aryloxy and acyl radicals. Examples of such nitriles include acetonitrile, propionitrile, butyronitrile, valeronitrile, stearonitrile, succinonitrile, glutaronitrile, pimelonitrile, adiponitrile, sebaconitrile, acelaonitrile, octadecanedinitrile, benzonitrile, phthalonitrile, terephthalonitrile, cyanonaphthalene, dicyanonaphthalene, 2,4'-dicyanodiphenyl, 4,4'-dicyanodiphenyl methane, 4,4'-dicyanodiphenyl, 4,4' - dicyanodiphenyl ethane, 4,4' - dicyanoalphagamma - diphenyl propane, 4,4' - dicyanodiphenyl ether, 4-cyanophenyl 4'-cyanobenzyl ether, 4,4'-dicyanodibenzyl ether, the ethers formed by the reaction of two molecules of a hydroxy benzonitrile (e.g., 4-hydroxy benzonitrile) with one molecule of the dibromide corresponding to a glycol in the series from methylene glycol to decylene glycol or to diethylene or triethylene glycol, gamma - methyl - gamma - acetylpimelonitrile, gamma - isopropenyl - gamma - acetylpimelonitrile, biscyanoethyl fluorene, 4,4' - dicyanobenzophenone, phenylacetonitrile, gamma - cyano - gamma - phenyl - pimelonitrile, the dinitrile corresponding to the dimer of linoleic acid, and the unsaturated nitrile derived from oleic acid.

In the preparation of a guanamine by the condensation of a nitrile with dicyandiamide, widely different molar proportions may be used. However, in the preparation of a monoguanamine the preferred proportion ranges from about 1 mol to about 1.5 mols of dicyandiamide for each mol of the nitrile (preferably a mononitrile) and the best results are obtained when the molar proportion is about 1.2 mols of dicyandiamide for each mol of the nitrile. In the preparation of a diguanamine the preferred proportion ranges from about 2.2 to about 2.6 mols of dicyandiamide for each mol of the nitrile (i.e., a dinitrile) and the best results are obtained by using about 2.4 mols of dicyandiamide for each mol of the nitrile. Correspondingly, in the preparation of a triguanamine the preferred proportion of dicyandiamide is slightly greater than 3 mols (i.e., about 3.6 mols) for each mol of the nitrile (i.e., a trinitrile).

The condensation of a nitrile with dicyandiamide is carried out by dissolving a strongly basic catalyst in a suitable primary or secondary alcoholic solvent such as benzyl alcohol or ethylene glycol mono-methyl ether, adding the nitrile and the dicyandiamide in a proportion within the range hereinbefore described, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When the precipitation of the guanamine is complete, the precipitate is filtered off and washed with boiling water to remove excess dicyandiamide and products of side reactions. The guanamine may be purified by converting it to a hydrochloride and neutralizing an aqueous solution of the hydrochloride to liberate the guanamine.

This method of preparation is versatile in that a large variety of nitriles may be used for the reaction with dicyandiamide, to give a wide variety of guanamines.

The nitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the nitrile by dehydration of the amide or directly from the carboxylic acid.

Diguanamines in which one or two of the exocyclic nitrogen atoms are substituted, as for example, sym.-diphenyladipoguanamine, hereinbefore mentioned, may be prepared by various methods. One method consists in reacting 1-phenyl biguanide, 1-o-tolyl biguanide, 1-m-tolyl biguanide, 1-p-tolyl biguanide, 1-(2',5'-dimethyl phenyl)biguanide, 1 - methyl - 1 - phenyl biguanide, 1-p-phenetyl biguanide or 1-ethyl-1-phenyl biguanide with sodium carbonate and adipyl chloride or the dichloride of any other dicarboxylic acid in chlorobenzene. Another method consists in reacting any of the aforementioned aryl or alkyl aryl biguanides or 1-methyl biguanide, 1-ethyl biguanide, 1-propyl biguanide, 1-butyl biguanide, 1-allyl biguanide, 1-crotyl biguanide, 1,1-dimethyl biguanide, 1,1-diethyl biguanide, or 1,1-diallyl biguadine, with the diethyl or dimethyl ester of adipic acid or any other dicarboxylic acid in the presence of an alkoxide catalyst. Still another method consists in reacting an alkyl or aryl dicyandiamide such as phenyl dicyandiamide with adiponitrile or the dinitrile of any other dicarboxylic acid.

Referring to ingredient (d) hereof, it will be recognized that this ingredient (d) is a thermoplastic resin forming ingredient, namely, an aromatic sulfonamide, or monosulfonamide, such as p-toluenesulfonamide, o-toluenesulfonamide or mixtures thereof, or alpha-toluenesulfonamide or any one or a mixture of aromatic monosulfonamides having two reactive amide hydrogens, preferably wherein the sulfonamido group is attached directly to the aromatic nucleus through the sulfur atom of the sulfonamido group. Such compounds represent a well known class, many of which are commercially available, as individual ortho or paratoluenesulfonamide (or mixtures thereof), benzene sulfonamide and/or $C_1$–$C_4$ alkyl benzene sulfonamides, wherein the alkyl group is attached to the benzene nucleus, which compounds are called (d) herein. The inclusion in (d) of nominal amounts of benzene disulfonamide is not actually prohibited. The benzene ring may also have substituents (other than the sulfonamido group) which are preferably comparatively inert or (apparently) nonreactive toward formaldehyde under the conditions of resin formation, and which are, of course, inert relative to the other resin forming ingredients present, i.e., (b), (c) and/or other (d) compounds and the coloring materials. In general, such other benzene ring substituents include those already defined for $R_1$ herein (i.e., alkyl, cycloaliphatic, aryl, etc. and/or oxygen in carboxyl, ether or hydroxyl groups). It will be understood that —OH and —$NH_2$ nuclear substituents (as in p-hydroxy benzene sulfonamide or p-amino benzene sulfonamide, i.e., sulfanilamide) qualify here as inert substituents presumably because, under ordinary mild reaction conditions here used, the sulfonamido-formaldehyde type reaction so dominates that there are no apparently undesirable side-reactions of the phenol-formaldehyde or aniline-formaldehyde category (which might possibly be involved because of nuclear —OH or —$NH_2$ benzene substituents) and side-reaction participation, if any, resulting from such nuclear substituents does not interfere with the desired results obtained in the practice of the invention.

DEMONSTRATION A–1

A charge of 30 grams of water and 0.5 gram of borax (decahydrate) is thoroughly admixed with stirring at 90° C. A charge of 36 grams of 91% (active) paraformaldehyde is then thoroughly dispersed in the reaction mixture, and this is followed by a charge of 42.6 grams of acetylene diurea also thoroughly dispersed in the reaction mixture, with continued heating upto 110° C. Then a charge of 102.6 grams of a mixture of o- and p-toluenesulfonamide and 2.4 grams of Brillant Yellow 6G base dye is thoroughly dispersed in the reaction mixture with continued heating up to 125° C., at which temperature 0.35 gram of 70% (aqueous) phosphorous acid is added. Heating (with stirring) is continued up to 180° C. at which there is added a dye premix of 0.96 gram of Rhodamine B Extra and 0.4 gram of Rhodamine 6GSW in 5 grams of clear resin [2] with a slight temperature drop followed by heating back up to 180° C. and then dumping the resin mass. When cooled, the resin mass hardens to form a thermoplastic, friable resin that may be readily reduced to fine particle size by grinding or similar size reducing operations; and the resulting product is a pigment having the characteristic color of the coloring material added thereto, which pigment has been found to be extremely useful in paint (formed with conventional paint vehicles, including film forming alkyds, drying oils, etc.) and in other resinous bodies. For example, the pigment thus formed may be milled into polyethylene in proportions of 1 to 10% of the weight of the polyethylene (and preferably about 2–3%) to obtain brilliantly colored polyethylene resins that may be used in conventional frabricating operations for polyethylene resins including the formation of sheets, plastic bottles, etc.

DEMONSTRATION A–2

Excellent results comparable to those just described are obtained in the preparation of another pigment resin made by initially dissolving, with stirring and heating up to 90° C., a charge of 0.2 gram of potassium tetraborate (tetrahydrate) in 35 grams of water; and then thoroughly dispersing therein charges of 32 grams of 91% (active) paraformaldehyde and 36 grams of acetylene diurea. After further heating to 110° C. a charge of 130 grams of a mixture of o- and p-toluenesulfonamide is added and dispersed thoroughly with continued stirring and heating up to 120° C. Then a charge of 8 additional grams of 91% (active) paraformaldehyde is dispersed in the reaction mix, which is heated on up to 180° C.; and then, after thoroughly dispersing therein 0.05 gram of 70% (aqueous) phosphorous acid, the reaction mass is dumped and cooled to obtain a thermoplastic friable resin that is easily reduced to fine powder for use as a clear pigment. Alternatively, the dye premix of previous paragraph A–1 is dispersed in the reaction mass before dumping and the results obtained are substantially the superior results previously described in A–1 (although the color or hue is not the same unless the Brilliant Yellow 6G base dye is also added as described).

DEMONSTRATION A–3

Comparable excellent results are obtained by dissolving a charge of 0.5 gram of potassium tetraborate (tetrahydrate) in 25 grams of water with stirring, heating to 90° C., followed by the addition of 0.05 gram of 70% (aqueous) phosphorous acid. Next, reaction in such aqueous system is effected between 38 grams of 91% (active) paraformaldehyde and 28.4 grams of acetylene diurea, and heating with stirring is continued up to 106° C. At this temperature a charge of 136.8 grams of a mixture of o- and p-toluenesulfonamide is thoroughly dispersed in the reaction mass, which is then heated on up to 180° C. and 0.30 gram of phosphorous acid (70% aqueous) is dispersed therein. The reaction mass is then dumped and cooled to obtain a thermoplastic friable resin that is easily reduced to fine powder for use as a clear pigment. Alternatively, the dye premix of previous paragraph A–1 is dispersed in the reaction mass before dumping and the results obtained are substantially the superior results previously described in A–1 (although the color or hue is not the same unless the Brilliant Yellow 6G base dye is also added as described).

[2] Note clear resin formed from procedure of Demonstration A–1 (above) except that the dyes are omitted.

DEMONSTRATION B–1

A pigment is obtained by first dissolving 0.4 gram of borax (decahydrate) in 35 grams of water, with stirring and heating up to 90° C., at which temperature charges are successively thoroughly dispersed therein of 74.8 grams of 91% (active) paraformaldehyde, 56.8 grams of acetylene diurea and 37.2 grams of benzoguanamine. The heating with stirring is continued up to 120° C. and then a charge of 102.4 grams of a mixture of o- and p-toluenesulfonamide is thoroughly dispersed in the reaction mix, with a temperature drop to about 100° C. at which temperature 0.30 gram of 70% (aqueous) phosphorous acid is added. Heating with stirring is continued up to 105° C. and then there is added a dye charge of 3.38 grams of Brilliant Yellow 6G base dye, 1.35 grams of Rhodamine B Extra and 0.54 gram of Rhodamine 6GSW, which is thoroughly dispersed with continued heating to 110° C., at which temperature the reaction mix is poured into a pan and cured therein in an oven at 150° C. for 45 minutes. The resulting product is also a thermoplastic friable material that is pulverized readily and found to have substantially the superior properties of the pigment product of paragraph A–1 hereof.

DEMONSTRATION B–2

A pigment is obtained by initially dissolving 0.15 gram of borax (decahydrate) in 35 grams of water while heating with stirring to 90° C., at which temperature charges are successively dispersed thoroughly therein of 47.5 grams of 91% (active) paraformaldehyde and 71 grams of acetylene diurea. Heating with stirring is continued up to 110° C., at which temperature a charge of 171 grams of a mixture of o- and p-toluenesulfonamide is thoroughly dispersed in the reaction mass. Heating and stirring are continued up to 120° C., at which temperature a charge of 3.64 grams of Brilliant Yellow 6G base is added and dispersed, and then up to 180° C., at which temperature 2 drops (approximately 0.10 gram) of 70% (aqueous) phosphorous acid, and a charge of 1.3 grams of Rhodamine B Extra, 0.58 gram of Rhodamine 6 GDN and 3.74 grams of the clear resin made according to the above formulation is thoroughly dispersed in the reaction mass and the same is dumped and cooled to obtain a friable readily grindable material having excellent pigment properties of heat and light stability in paint and ink vehicles.

DEMONSTRATION B–3

A pigment is obtained by initially dissolving 0.4 gram of borax (decahydrate) in 35 grams of water at 90° C. and then with added heating and stirring introducing and thoroughly dispersing a charge of 66 grams of 91% (active) paraformaldehyde and then 85.2 grams of acetylene diurea, with continued heating up to 115° C. Then a charge of 102.6 grams of a mixture of o- and p-toluenesulfonamide is thoroughly dispersed in the reaction mass with 6 drops of 70% (aqueous) phosphorous acid, 3.4 grams of Brilliant Yellow 6G base, 1.17 grams of Rhodamine B Extra and 0.51 gram of Rhodamine 6 GDN; and the addition of the foregoing results in an initial temperature drop of 20 to 30° C. but heating with stirring is continued back up to 105° C., at which temperature the reaction mass is poured into a pan and cured in an oven for one hour at 150° C. The resulting cured resin is thermoset but can be ground to very fine pigment particle sizes having the superior pigment properties already described (although the thermoset resin is typically more difficult to grind than the thermoplastic resins hereof).

DEMONSTRATION B–4

A pigment is prepared by initially dissolving 0.15 gram of borax (decahydrate) in 35 grams of water, heated with stirring to 90° C., at which temperature a charge of 38 grams of 91% (active) paraformaldehyde and 25.2 grams of melamine is thoroughly dispersed therein, followed by successive additions of 171 grams of a mixture of o- and p-toluenesulfonamide and 42.6 grams of acetylene diurea, in each case being thoroughly dispersed in the reaction mass. Next, a charge of 3.8 grams of Brilliant Yellow 6G base dye is thoroughly dispersed in the reaction mass still at about 90–95° C. (since the addition of each of the charges tends temporarily to offset the effect of continued heating); and then the reaction mass is heated with stirring on up to 180° C., at which temperature a charge of 1.1 grams of Rhodamine B Extra and 1.9 grams of Rhodamine 6 GDN and 6.1 grams of the clear resin of Demonstration B–2 is thoroughly dispersed and the reaction mass is dumped and cooled to room temperature to obtain a product which is ground to fine particle size to obtain a pigment of excellent color and stability.

DEMONSTRATION C

Other pigments are made using the molar proportions shown in Table 1 below (wherein, for reference, Run C–1 describes the molar ratios of essential resin-forming reactants actually used in the specific example of Demonstration B–4, which in turn correlates the amount of resin product with such other materials used as water, buffer, dyes, etc.). The variety of formulations which can be employed is shown in Table 1.

TABLE 1.—RELATIVE MOLAR PROPORTIONS OF REACTANTS

| Run | (a) F [1] | (b) | (c) | (d) | Add. |
|---|---|---|---|---|---|
| C–1 | 6 | 1.5 AU [2] | 1 M [5] | 5 TSA [8] | |
| C–2 | 4 | 1 AU | 1/3 M | 3 TSA | |
| C–3 | 6 | 1 AU | 1/3 M | 4 TSA | |
| C–4 | 5.5 | 1 AU | 0.5 M | 2.7 TSA | |
| C–5 | 14 | 1 AU | 1.5 M | 8 TSA | |
| C–6 | 11 | 1 AU | 2 U [6] | 6 TSA | |
| C–7 | 3 | 1 AU | X | X | 1 DMH [9] |
| C–8 | 12 | 2 AU | 1 Bz [7] | 3 TSA | |
| C–9 | 6 | 1 AU | 1/3 Bz | 4 TSA | |
| C–10 | 6 | 1 AU | X | 4 TSA | |
| C–11 | 3.5 | 1 AU | X | 2.5 TSA | |
| C–12 | 7 | 1 AU | X | 4 TSA | |
| C–13 | 5 | 1 AU | X | 3 TSA | |
| C–14 | 4 | 1 AU | X | 2.5 TSA | |
| C–15 | 4 | 1 AU | X | 2 TSA | |
| C–16 | 3 | 1 AU | X | 2 TSA | |
| C–17 | 2.7 | 1 AU | X | 2 TSA | |
| C–18 | 4 | 1 AU | X | 1 TSA | |
| C–19 [10] | 3.5 | 1 AU | X | 1 TSA | |
| C–20 | 4 | 2 AU | X | 1 TSA | |
| C–21 | 3 | 1 AU | X | 0.75 TSA | |
| C–22 | 2 | 1 DiMe [3] | X | 1 TSA | |
| C–23 | 2 | 1 DiEt [4] | X | 1 TSA | |
| C–24 | 3 | 1 DiMe | X | 2 TSA | |

[1] F is formaldehyde (paraformaldehyde).
[2] AU is acetylene urea.
[3] DiMe is 1,6- and 1,4-dimethyl acetylene urea (isomer mix).
[4] DiEt is 1,6- and 1,4-diethyl acetylene urea (isomer mix).
[5] M is melamine.
[6] U is urea.
[7] Bz is benzoguanamine.
[8] TSA is mix. of o- and p-toluenesulfonamide.
[9] DMH is dimethyl hydantoin.
[10] C–19 product is thermoset resin.

As the previous demonstrations hereof show, the procedures employed for the Runs C–1 through C–24 may vary considerably; but typical specific procedures include B–4 for Run C–1; B–1 for C–8; B–3 for C–19; A–1 for Run C–15; A–2 for Run C–13; A–3 for Run C–10; and B–2 for Run C–16.

Runs C–22 through C–24 (using, e.g., substantially the procedure B–2) are found to produce good pigment resins. In particular, the product of Run C–24, from XXIXb and XXIXc, is found to have superior light stability and other requisite dye carrying properties; and, also, in the same procedure (i.e., B–2) various of the other acetylene urea compounds XXIXn, XXIXq and XXIXr produce superior results. In fact, the procedure B–2 is typical for the use of any one or more of the acetylene urea class XXIX through XXIXt in the production of pigment resins possessing the advantages hereinbefore described. The same compounds are also used to advantage (in place of acetylene urea per se) in procedures B–4 and B–1.

As previously pointed out herein, the overall molar ratios of (a):(b) plus (c) and/or (d) may range from a practical maximum of substantially 2:1 to a practical minimum of substantially 1:2. It is understood that a somewhat greater amount of formaldehyde may be used, i.e., a ratio of 2.5 or 3:1, but the theoretical amount of formaldehyde required for substantially complete condensation is understood to be only slightly more than 1:1 (molar ratio being used herein unless otherwise specified), so substantial excesses above the indicated range would ordinarily result in a certain amount of loss of excess formaldehyde during the condensation reaction, as constrasted to participation in such reaction. On the other hand, it is possible to use less than the theoretical amount of formaldehyde (and this also is shown on Table 1), and in so doing one will obtain a pigment resin having a melting or softening point that is somewhat lower than that which would be obtained if at least the so-called theoretical amount of formaldehyde were present. This procedure has some advantages in that a depressed melting point may be very useful for certain purposes, particularly when this procedure serves to obtain a generally meltable or thermoplastic type of material which is more easily ground and/or otherwise handled for pigment purposes. A preferred range for (a):(b) plus (c) and/or (d) is about 3:1 to about 4:5. Essentially the same numerical ratios apply for the molar relationships (a):(b) plus (c), (a):(b) plus (c) and (d), and (a):(b) plus (d).

In general, pigments containing the sulfonamide component (b) have been found to function more advantageously with preferred daylight fluorescent dyes used in the practice of the instant invention. In fact, although the ratio for (b):(c) and/or (d) may range from a practical maximum of 20:1 to a practical minimum of 1:20; in those cases in which pigments are made using a significant portion the resin forming component (d), it is found that the ratio of (d):(b) alone or in combination with (c) is preferably within the range of approximately 10:1 to 1:10. In the case of essentially difunctional (i.e., di —NH— containing) compounds of the (b) group, it is generally understood that such ingredients or components (b) are similar to the ingredient (d) in that each of these ingredients will contain two reactive hydrogens and they are each functional essentially for reaction with formaldehyde to produce meltable or thermoplastic resins. In contrast, the preferred poly-$NH_2$ component (c) such as melamine or benzoguanamine is recognized as an essentially thermosetting resin former when reacted with formaldehyde. In instances of using the combination of materials just mentioned, it is found that the molar ratio of (c):(b) plus (d) may range from an upper limit of perhaps 1:1 or even 3:2 down to perhaps a lower practical limit of 1:10 in order to obtain a particularly useful thermoplastic resin in the practice of the invention, which resin is particularly useful in the pigment function herein described.

DEMONSTRATION D

A charge of 22.6 grams of monomethylol dimethyl hydantoin is melted to 115° C. With stirring, a charge of 4.6 grams of paraformaldehyde (95%) is added slowly and the temperature dropped to 100° C. Next, a charge of 122.1 grams of paratoluenesulfonamide is added slowly with stirring, after which a charge of 31 grams of a B-stage unmodified melamine-formaldehyde resin (Resimene 814) is slowly added, followed by the addition of a charge of 13.7 grams of paraformaldehyde (95% active). The temperature is raised and, at 110° C., a charge of 3.5 grams of Brilliant Yellow 6G base is added and, at 145° C., a charge of 0.54 gram of Rhodamine 6 GDN Extra and 1.05 grams of Rhodamine B Extra is added. The melt is then heated to 175° C. and held for 10 minutes, to effect complete cocondensation, and then dumped (and cooled) to form a friable thermoplastic resin that may be readily ground to form a daylight fluorescent pigment. It was found that the resulting product has better heat stability than a corresponding pigment made using only the paratoluenesulfonamide (and not the dimethyl hydantoin) as a thermoplastic resin-former, using proportions which result in a melting point that is the same as that here obtained.

DEMONSTRATION E

A charge of 30 grams of water, 51.4 grams of dimethyl hydantoin, and 16.6 grams of paraformaldehyde (95%) is first heated to 75° C. and then the coloring matter, in the form of 32 grams of Ultramarine Blue, is added. Next, a charge of 37.4 grams of benzoguanamine is added slowly with stirring and the reaction mass is heated to 215° C. and held there until cocondensation is completed. The resulting thermoplastic resin may be readily ground to form a blue pigment.

The foregoing procedure is repeated except that 50 mol percent of the dimethyl hydantoin is replaced by a corresponding molar proportion of a mixture of ortho and paratoluenesulfonamide, and the resinous product is readily ground to obtain a comparable blue pigment, apparently possessing improved ease of grindability and color characteristics.

A bright yellow fluorescent pigment is obtained by carrying out either of the procedures of the previous two paragraphs, except that 2.5 g. of Brilliant Yellow 6G [3] is substituted for the Ultramarine Blue.

DEMONSTRATION F

A charge of 100 grams of water, 64 grams of dimethyl hydantoin, 82.5 grams of paraformaldehyde (95%) and 256.5 grams of a mixture of ortho and paratoluenesulfonamide is heated to 95°, at which temperature a charge of 7.5 grams of Brilliant Yellow 6G [3] is added. The reaction mixture is heated to 175° C. at which temperature a charge of 2.52 grams of Rhodamine B Extra and 1.08 grams of Rhodamine 6GDN Extra is added and the reaction mass is heated to 180° C. and dumped, to obtain a thermoplastic resin that may be readily ground to form a yellow pigment. This resin is alcohol-soluble and it is representative of still another aspect of the instant invention.

This aspect of the instant invention resides in the concept of the production and use in pigments of a resin that is formed by the cocondensation of ingredients (a), (b) and (d). In this resin, as previously indicated, the molar ratio of formaldehyde (a) to the resin formers (b) plus (d) may range from a practical maximum of about 2:1 (but preferably about 1.5:1) to a practical minimum of about 1:2 (but preferably about 1:1); and the molar ratio of the heterocyclic resin former (b) to the aromatic sulfonamide resin former (d) may range from 20:1 to 1:20, but preferably it ranges from a ratio of 1:5 to a ratio of 5:1, which is a practical minimum for the proportion of the aromatic sulfonamide (d) which may be used effectively to obtain the advantages of the invention in the formation of this particular resin: (a) (b) (d), particularly when an alcohol-soluble thermoplastic resin is desired. It will be appreciated that alcohol solubility is reduced in this system (a) (b) (d) by the selection for (b) of acetylene urea (XXIX) and/or other polyfunctional compounds of this group (XXIXa) through (XXIXs) (and also by inclusion of ingredient (c) in the resin-forming reaction).

DEMONSTRATION G

A charge of 53 grams of monomethylol dimethyl hydantoin and 114 grams of a mixture of ortho and paratoluenesulfonamide is heated to 130° C. with stirring, and a charge of 10 grams of paraformaldehyde (95% active) is added slowly and the reaction mixture is then heated up to 170° C. and held until clear (evidencing completion of the cocondensation reaction).

---
[3] Brilliant Yellow 6G is 6G base, as used herein.

DEMONSTRATION H

A charge of 52.7 grams of monomethylol dimethyl hydantoin and 10.5 grams of paraformaldehyde (95% active) is heated together with stirring to a temperature of 140° C. Then a charge of 114 grams of p-toluenesulfonamide is added and the mix is heated to 150° C. with stirring. Next, a charge of 3 grams of Brilliant Yellow 6G is added and the mix is heated to 170° C.; and then a charge of 5 grams of paraformaldehyde (95% active) is added to the reaction mix with stirring and it is held at 170° C. for 10 minutes, after which time a dye combination of 0.66 gram of Rhodamine 6GDN and 0.99 gram of Rhodamine B Extra is added and the reaction mix is held at 170° for another 10 minutes and then dumped to yield a friable, thermoplastic resin that is readily ground to form a brilliantly colored pigment.

A brilliant yellow pigment is obtained following the procedure of Demonstrations G and H, except that the only color added is a charge of 4.5 grams of Brilliant Yellow 6G just prior to heating to 170° C. in each case.

DEMONSTRATION I

A charge of 20 grams of water, 16.8 grams of paraformaldehyde (95%) and 38.4 grams of dimethyl hydantoin is heated to 95° C.; and a charge of 56.1 grams of benzoguanamine is then added and the reaction mass is heated to 220° C. to effect completion of the cocondensation reaction. At the elevated temperature 2% by weight of Lumogen Light Yellow L is added and the resulting resin is cooled and ground to form a fluorescent yellow pigment.

The foregoing procedure is repeated, except that ½ of the molar proportion of benzoguanamine is replaced by the corresponding molar proportion of paratoluenesulfonamide, and it is found that a comparable fluorescent yellow pigment which appears to possess not only the improved heat stability characteristics of the pigments of the invention but also possesses improved light stability in general color characteristics.

The procedure described in the first two paragraphs of Demonstration I may be repeated replacing the benzoguanamine with equimolar proportions of melamine or of each of the polyamino Compounds XXX through LV, with comparable results. The resulting pigment resin obtained in each case using the proportion of paratoluenesulfonamide specified is found to be a thermoplastic resin.

In place of p-toluenesulfonamide one may use the same amount of mixed o- and p-toluenesulfonamide.

DEMONSTRATION J

A pigment resin is made by heating a charge of 79 grams of monomethylol dimethyl hydantoin to 115° C., then slowly adding with stirring 31 grams of paraformaldehyde (95% active) at about 95–105° C., then adding slowly with stirring 171 grams of paratoluenesulfonamide and heating to 185° C., and holding there until the cocondensation reaction is completed. A charge of 2 grams of Brilliant Yellow 6G is then thoroughly dispersed in the reaction mass at the elevated temperature, and the reaction mass is dumped to yield a friable, thermoplastic resin that is readily ground to yield a brilliant yellow pigment.

DEMONSTRATION K

A pigment resin is made by heating a charge of 39.5 grams of monomethylol dimethyl hydantoin to 115° C.; and then slowly adding with stirring 31.5 grams of paraformaldehyde (95% active) at 95–105° C.; and then slowly adding with stirring 128.2 grams of paratoluenesulfonamide; and finally heating to 185° C. and holding there until the cocondensation reaction is apparently completed. A charge of 2 grams of Brilliant Yellow 6G is then dispersed in the molten reaction mass at 170° C., and the reaction mass is dumped to yield a thermoplastic resin that is readily ground to form a brilliant yellow pigment.

Comparable results are obtained by carrying out Demonstrations F, G, H, J and K using in place of the dimethyl hydantoin and monomethylol dimethyl hydantoin, corresponding molar proportions of each of the hydantoins, or their monomethylol derivatives, (I) through (XVI) hereinbefore specifically referred to. Also, comparable results may be obtained by substituting corresponding molar proportions of each of the other compounds, or their monomethylol derivatives, (XVII) through (XXVIII) hereinbefore specified in place of the dimethyl hydantoin and monomethylol dimethyl hydantoin in Demonstrations F and G.

DEMONSTRATION DD

It will also be appreciated that the corresponding molar proportion of the monomethylol derivatives of each of the heterocyclic resin-formers (I) through (XXIXs) may be used to replace the monomethylol dimethyl hydantoin in the procedure of Demonstration D, in order to obtain comparable results. Likewise, it will be appreciated that the corresponding molar proportion of each of the aforesaid heterocyclic resin-formers (I) through (XXIXs) may be used to replace the dimethyl hydantoin in the procedure of Demonstration I, in order to obtain comparable results.

In Demonstration D the ingredient (c) used is melamine (although prereacted with formaldehyde) and in Demonstration I the corresponding ingredient is benzoguanamine (which has not been prereacted with formaldehyde). If the procedures of Demonstration D or Demonstration I are carried out using twice the molar proportion of melamine or benzoguanamine specified, plus a corresponding molar increase in the amount of formaldehyde in each case, it will be appreciated that the resulting colored resinous product is a thermosetting (or thermoset) resin, but such resin can still be ground to obtain a finely divided colored pigment of superior properties. Similarly, the thermosetting-type resinous pigment is obtained if the melamine or benzoguanamine (in Demonstration D or I, whichever the case may be) is replaced by a corresponding molar proportion of the previously defined polyamino Compounds XXX through LV. In particular, when such polyamino compounds as adipoguanamine (XLVIII) is used, even when the same is used in the smaller molar proportions specified for ingredient (c) in Demonstrations D and I. This is also the case in connection with the other polyguanamines (XLVI) to (LV) used, and/or they are used in greater molar proportions with a corresponding increase in the amount of paraformaldehyde employed. The initial or immediately apparent feature of such pigments will be their higher melting point (particularly if the amount of ingredient (c) and/or the amount of ingredient (a) is not quite sufficient to readily render the pigment resin thermoset), but continued heating and/or increases in the relative molar proportions of ingredient (c) with corresponding increases in the molar proportion (a) will ultimately result in the thermoset pigment resin, which in some instances may not be ground to the desired pigment particle size with the most desirable ease and advantages characteristic of the invention, but which may still be ground to pigment particle size so as to obtain pigments having numerous of the various other advantages of the invention.

DEMONSTRATION L

A pigment resin is made by heating a charge of 5 mols of water, 3 mols of paraformaldehyde, 1 mol of melamine and 3 mols of 5,5-phenyl methyl hydantoin to a temperature of 200° C. and holding until the cocondensation reaction is apparently completed. A charge of 1% of the weight of the resin of Brilliant Yellow 6G may then be dispersed in the molten mass at approximately 170° C., and the reaction mass is dumped to yield a thermoplastic resin that is readily ground to form a brilliant yellow pigment.

Comparable results are obtained by carrying out the procedure just outline using in place of the 3 mols of phenyl methyl hydantoin a combination of 2 mols of phenyl methyl hydantoin and 1 mol of alpha-toluenesulfonamide.

DEMONSTRATION M

A pigment resin is prepared by heating a charge of 25 grams of water, 9.4 grams of 91% paraformaldehyde, 12.6 grams of melamine and 50.4 grams of (XXII) 5,5-pentamethylene hydantoin to a temperature of 210° C. and holding there until the cocondensation reaction is apparently completed. Two drops of 70% phosphorous acid are added to the molten reaction mass; and, at approximately 170° C., a charge of 1% by weight of the total resin of Brilliant Yellow 6G is then dispersed in the molten mass.

As indicated in the previous Demonstration L, comparable results are obtained by carrying out the procedure just outlined using, as a replacement for 50 molar percent of the melamine specified, a corresponding molar proportion of paratoluenesulfonamide and, after the resulting molten resinous masses have been cooled in each of these procedures, and ground readily to form the resulting yellow pigment, such pigments have generally comparable appearance.

DEMONSTRATION N

A pigment resin is made by heating a charge of 25 grams of water, 9 grams of paraformaldehyde (91%), 17.8 grams of benzoguanamine, and 32 grams of (XXII) 5,5-pentamethylene hydantoin to 210° C. and holding there until the cocondensation reaction is apparently completed. A charge of 1% of the total weight of the resin of Brilliant Yellow 6G is then dispersed in the molten reaction mass at about 170° C., and the reaction mass is dumped to yield a thermoplastic resin, as in the case of the previously described resin in Demonstration M, and these resins are readily grindable to form Brilliant Yellow pigments.

If a procedure is carried out that is the same as that described in the previous paragraph, except that ½ of the molar proportion of benzoguanamine is replaced by a corresponding molar proportion of sulfanilamide, the resulting colored pigment is generally comparable in appearance.

With respect to the more specific aspects of preferred proportions in the practice of the instant invention, it has been found that it is generally preferred to use approximately 1 mol of formaldehyde (a) for each mol of ingredients (b), (c) and/or (d) that are used. Also, it has been found generally preferable to use from ½ to 3 mols of ingredients (b) and/or (d), preferably when hydantoin compounds are used, for each mol of ingredient (c), particularly when a triazine compound such as melamine or benzoguanamine is employed. Such is also the case when (b) is of the (XXIX) series. Comparable results are obtained using the procedures of Demonstrations L, M and N, except that the hydantoin compound in each case is replaced by a corresponding molar proportion of acetylene urea.

It will also be appreciated that the instant invention contemplates a pigmented liquid composition suitable for forming coating films and self-sustaining bodies, consisting essentially of the instant pigment resin dispersed as an undissolved, finely divided solid in a substantially transparent liquid vehicle binder which is not a solvent for such pigment and is convertible to a solid state. In such liquid compositions, the color may be provided in the form of fluorescent or non-fluorescent dyes dispersed in the transparent vehicle and/or the pigment resin; and coloring may also be provided in the form of insoluble and/or inorganic pigments of the conventional type commercially available. It will thus be seen that the liquid vehicle may have nonfluorescent coloring material dispersed therein plus the resin pigments of the invention with a fluorescent coloring material dissolved therein.

The following example illustrates a paint containing a new pigment of the invention in combination with a conventional pigment:

DEMONSTRATION O

| | Parts |
|---|---|
| Long oil alkyd (castor oil type, 54% solids) | 50 |
| Driers (metal naphthenates) | 0.7 |
| Mineral spirits | 10 |
| Cadmium primrose | 4.5 |
| Pigments as per Demonstrations V, W, D, G, H, I, E, J and/or K | 50 |

This material is dispersed on a conventional three-roll ink mill. The above paint, when applied by brush, dries principally by oxidation to a hard film and produces a bright red color.

The alkyd resin may be replaced by other varnishes which upon drying give a relatively transparent film. Also, the cadmium primrose may be replaced by another nonfluorescent pigment such as, for example, Hansa yellow.

The following example illustrates a paint especially formulated to produce a flexible film suitable for coating fabrics, rubber articles, and the like:

DEMONSTRATION P

The ingredients of the following components A and B are separately mixed, as by ball milling.

| Component A: | Parts |
|---|---|
| Chloro-sulfonated polyethylene containing about 27% chlorine and 1.5% sulfur and polymerized to solid form | 40 |
| Xylol | 160 |
| Component B: | |
| Light calcined magnesium oxide | 7.4 |
| Pigment as per Demonstrations L, M or N | 30.0 |
| Xylol | 85.6 |
| Mercaptobenzothiazole | .8 |
| Diphenyl guanidine | .2 |
| Hydrogenated rosin | 1.0 |

40 parts of component A and 24.4 parts of component B are then thoroughly mixed to produce a sprayable coating composition that sets in part by solvent evaporation and in part by vulcanization or condensation and has a pot life of about 4 hours at room temperature. Minor dilutions to adjust the viscosity for spraying may be made with xylol or toluene. The cure may be effected at room temperature or may be accelerated by heating at temperatures up to about 110° C. for 20 to 30 minutes.

The following example is illustrative of a plastisol suitable for casting or molding into finished solid objects:

DEMONSTRATION Q

| | Parts |
|---|---|
| 95% vinyl chloride-5% vinyl acetate copolymer | 50 |
| Dioctyl phthalate | 12.5 |
| Dioctyl sebacate | 12.5 |
| Pigment as per Demonstrations E, I, V or Y | 20 |
| Epoxy resin stabilizer, 175 to 210 Epoxide equivalents (Shell "Epon 828") | 3 |

When this plastisol is cast or molded into bodies of appreciable thickness, it is heat cured at about 350°–360° F. for long enough to reach this temperature throughout the mass which may require from 10 to 20 minutes. When formed into thin films or thin walled bodies, curing for from 3 to 5 minutes at that temperature will suffice.

The composition of this last example may be diluted by adding up to about 15 parts of V. M. & P. naphtha or 15 parts of a 50% mixture of V. M. & P. naphtha and toluol to 85 parts of the plastisol to produce an organosol which may be more easily spread into thin films for making self-sustaining, colored, transparent sheet materials or thin walled bodies.

Demonstrations O, P and Q have been given primarily to show that the pigments of the present invention, when colored with a fluorescent naphthalimide or a fluorescent xanthene dye, are not limited in their utility to being suspended in a particular type of vehicle binder, either as regards the chemical character of the vehicle or the physical properties which render the vehicle suitable for different uses. The light-fastness, color strength, and fluorescent properties of the resultant products compared to the same vehicle compositions containing prior art pigments are imparted primarily by the new pigment resin employed in accordance with the invention as a solvent for the dye. Such improved properties are achieved to the most pronounced degree when the vehicle binder has the new pigment or pigments dispersed therein in an undissolved, finely-divided state, as illustrated. As should be evident from the variety of different vehicle binders disclosed, this improvement is independent of the chemical composition of the vehicle binder and of the process by which it is converted to a solid state, so long as the vehicle binder is not a solvent for the pigment and is substantially transparent so as to permit the fluorescent properties of pigment particles within the body of the solidified binding medium to be effective.

The following example illustrates a coating composition in which the pigment of the invention is dissolved in the vehicle binder:

DEMONSTRATION R

For coating wood, the following formulation may be used:

| | Parts |
|---|---|
| Pigment as per Demonstrations E or V | 14 |
| Low viscosity cellulose butyrate | 22 |
| Dioctyl phthalate plasticizer | 12 |
| Methyl ethyl ketone | 25 |
| Ethyl acetate | 25 |
| Toluene | 10 |

If a sprayable composition is desired, the above formulation may be thinned out with an additional 25 grams of ethyl acetate and 25 grams of toluene. The resulting coating is transparent and has a reddish color. A white or other colored primer coat may be applied to the wood before applying the resin coating so as to provide a diffusely reflecting background. Such a primer coat should be used when coating a metal or the like.

DEMONSTRATION S

A charge of 35 grams of water, 19.5 grams of paraformaldehyde (95%) and 43 grams of ethylene urea is first heated to 90° C. Then a charge of 21.0 grams of paratoluenesulfonamide is added with continued heating and stirring. Next, a charge of 23.1 grams of benzoguanamine is added and the reaction mixture is heated to 190° C., at which temperature the reaction mass is maintained until cocondensation is completed as evidenced by the end of bubbling or foaming. Then a charge of 2 grams of Brilliant Yellow 6G is added and thoroughly dispersed in the reaction mass, which is then allowed to cool to form a friable thermoplastic resin. This material is readily ground to pigment particle size, to obtain a brightly colored pigment which may be used as indicated in Demonstration A herein. The procedure of this paragraph is repeated, except that 50% of the molar proportion of benzoguanamine used is replaced by a corresponding molar proportion of acetylene urea and it is found that comparable results are obtained, which is also true in connection with repetition of this procedure, except that all of the benzoguanamine is replaced by a corresponding molar proportion of acetylene urea.

DEMONSTRATION T

A procedure is carried out that is the same as those described in Demonstration S, except that the ethylene urea is replaced by an equimolar proportion of hydantoin and comparable results are obtained. Comparable results are also obtained if the same procedure is carried out, except that the hydantoin is replaced by an equimolar proportion of methyl isobutyl hydantoin, and a charge of 10 grams of isopropanol is added to the initial charge to facilitate bringing the methyl isobutyl hydantoin into solution and reaction in the initial charge. Comparable results are obtained if the same procedure is repeated using the corresponding molar proportion of phenylhydantoin in place of the emthyl isobutyl hydantoin.

In fact, pigments of comparable brightness and color (although varying melting points) may be obtained by substituting for the phenylhydantoin in the previously mentioned procedure the molar equivalent of each of the various previously mentioned hydantoins (V) through (XVI), although it may be necessary to maintain the initial reaction mass at 90° to 100° C. for a longer period of time in order to obtain substantial homogeneity, before the addition of paratoluenesulfonamide and of the benzoguanamine and/or acetylene urea charge and subsequent heating to 190° C. The completion of the reaction would, however, in each instance be evidenced by not only the termination of bubbling or foaming but the formation of a substantially homogeneous reaction mass, which upon cooling (and drying to remove the initial solvent) is a friable resinous solid that may be readily ground to pigment size.

DEMONSTRATION U

An initial charge of 4.5 mols of water, 2 mols of dimethyl hydantoin (b), and 2.7 mols of paraformaldehyde (a) is heated to 90° C. to obtain a homogeneous reaction mass, to which is first added ½ mol of paratoluenesulfonamide (d) and then added ½ mol of benzoguanamine (c), and the reaction mass is heated to 205° C. and maintained there until cocondensation is completed. After cooling a clear friable thermoplastic resin (U–1) is obtained, which may be readily reduced to pigment size particles by grinding.

Comparable resins are prepared using in the foregoing procedure the following formulations:

| Resins | U–2 | U–3 | U–4 |
| --- | --- | --- | --- |
| (a) Paraformaldehyde, mols | 2.7 | 2.7 | 2.7 |
| (b) Dimethyl Hydantoin, mols | 0.5 | 0.5 | |
| Acetylene Urea,[1] mols | 0.5 | 0.5 | 0.7 |
| (c) Benzoguanamine, mols | 0.5 | | |
| (d) Paratoluene sulfonamide, mcls | 1.5 | 2.0 | 2.3 |

[1] Although the 5-membered heterocyclic rings are preferred in the molecular structure of the polyheterocyclic compounds of group (b), and acetylene urea is preferred among the polyheterocyclic compounds (XXIXa) through (XXIXs), it will be understood that comparable results are obtained using others of compounds (XXIXa) through (XXIXu) in the corresponding molar ratio in place of the acetylene urea in the above formulation. Common chemical structural features of preferred compound (b) such as dimethyl hydantoin and acetylene urea are that they both have 5-membered heterocyclic rings (containing such –NH– groups), at least one such ring containing three C's and two N's in the nucleus, a plurality of intracyclic –CO– groups and intracyclic

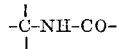

groups (although one of the C's in hydantoin is common to both such groups); and both contain at least one ureido group, with a pair of such –NH– groups in a single ureido (i.e., unsubstituted) group. The plural heterocyclic structure of acetylene urea is, of course, a distinction.

Separate portions of the resulting resins (U–1, U–2, U–3 and U–4) are remelted to about 180–190° C. and 2% of the weight thereof of Brilliant Yellow 6G base is added thereto (and thoroughly dispersed therein), and upon cooling and grinding to fine particle size, it is found that in each case a bright yellow pigment is obtained.

The procedure of the foregoing paragraph is repeated for each resin except that the coloring material added is 1% of the weight of the resin of Rhodamine B Extra (instead of the Brilliant Yellow 6G base) and the resulting product is a magenta pigment.

The procedure of the previous paragraph is repeated for each resin except that (in place of the Rhodamine B) the coloring material added is 1% of the weight of the resin of Xylene Red B and 1% Brilliant Yellow Acid 8G, and the result is a bright orange-red pigment.

It will be appreciated that in the case of any of the previously described thermoplastic resins, the coloring material may be added after the initial recovery of the friable resin itself (by the remelting process just described), or the coloring material may be added (as previously described) during the reaction itself or preferably just at the completion of the co-condensation reaction and prior to cooling that would reduce the fluidity of the resin to the extent that the coloring material cannot be readily dispersed therein.

It will also be appreciated that the coloring material may be added to the resins of this demonstration, and to the resins of each of the other demonstrations described herein, by dissolving the resin and the dye in a solvent therefor. For example, 100 grams of the resin in the case of each of the resins of the instant Demonstration U may be dissolved in 300 grams of acetone along with 0.5 gram of Rhodamine B Extra and 0.5 gram of Rhodamine 6GDN Extra, and after a thorough dispersion, the acetone may be evaporated to obtain a friable resin product which may be reduced to a finely divided state to obtain a brightly colored pigment.

It will also be appreciated that any of the resins described in the instant demonstrations may be prepared initially as undyed resins, solidified, finely ground to pigment particle size and then have the desired coloring material or dyestuff incorporated therein in a dye bath. For example, a dye bath may be prepared from a charge of 40 milliliters of water, 1 gram of isooctyl phenyl ether of polyethylene glycol ("Triton X–100," a commercially available surfactant), 10 milliliters of 90% formic acid, 0.5 gram of Rhodamine B Extra and 0.05 gram of Rhodamine 6GDN Extra, and a total of 5 grams of powdered clear resin, in the case of each of the resins obtained by carrying out the procedure of the first and second paragraphs of the instant Demonstration U, in finely divided form, is added to the dye bath, which is then heated to a temperature of about 45° C. to hasten the incorporation of the dye in the resin. After this the dyed resin is filtered from the bath, washed with cold water and dried to obtain a brilliantly colored pigment.

It will also be appreciated that the conventional inorganic pigments (e.g., titanium dioxide) may be incorporated in the pigments of the invention. For example, a sample of any one of the clear resins described in the first and second paragraphs of this demonstration may be remelted to 180–190° C. and (with or without the addition of any of the dyes hereinbefore described) 1–2% by weight of titanium dioxide pigment may be dispersed therein. The commercially available titanium dioxide pigments may be obtained in extremely minute particle size, so that subsequent grinding of the instant resin to a finely divided particulate condition suitable for conventional pigment use would result in particles of the resin matrix containing a plurality of very fine titanium dioxide particles therein. Other inorganic pigments may, likewise, be incorporated in the instant resin, or in any of the other resins described herein.

DEMONSTRATION V

A charge of 25 grams of water, 18.5 milliliters of aqueous (29%) ammonium hydroxide, 37 grams of paraformaldehyde, 8.25 grams of Brilliant Yellow 6G, 24.7 grams of finely ground titanium dioxide pigment, and 85.3 grams of dimethyl hydantoin is heated together with stirring to 90° C.; next is added a charge of 45.6 grams of paratoluenesulfonamide; and then a charge of 23 grams of benzoguanamine is added and the reaction mixture is heated to 215° C. until cocondensation is completed. Upon cooling and recovering the friable solid resinous product, it is found that this product may be ground to fine particle size to obtain a bright yellow pigment.

Comparable results may be obtained by carrying out the procedure of the previous paragraph, except that the dimethyl hydantoin is replaced by an equimolar proportion of phenylene urea (XX).

Comparable results may also be obtained by replacing the phenylene urea in the procedure of the previous paragraph with an equimolar proportion of parabamic acid (XVII), imidazolone (XVIII), 5,5-pentamethylene hydantoin (XXII), phenyl imidazolone (XXIII), phenyl imidazolidone (XXIV), isopropyl imidazolidone (XXV), diphenyl imidazolidone (XXVI), triazolone (XXVII), and/or triazolidone (XXVIII).

It will also be appreciated that the foregoing procedures can be carried out without the use of the coloring material suc has the Brilliant Yellow 6G base and/or titanium dioxide pigment in the initial reaction mixture; and one or both of these coloring materials may be added subsequently in the manner described in Demonstration U.

As indicated hereinbefore, one of the types of heterocyclic resin former (b) that has been found to be particularly useful in the practice of the instant invention is acetylene urea (XXIX) and/or poly-ureido or poly-heterocyclic compounds indicated in the general category of (XXIXa) through (XXIXs). The poly-heterocyclic ring compounds used for ingredient (b) appear to impart to the resinous pigment unusual resistance to aging, or expressed in other terms, unusual light-stability under conditions of use.

DEMONSTRATION V

A pigment resin is made by taking a charge of 158 grams of monomethylol dimethyl hydantoin and melting to 145° C., and, with stirring, adding slowly 93.5 grams of benzoguanamine, upon which addition the temperature dropped to 125° C. Next, a charge of 4.66 grams of Brilliant Yellow 6G base (sometimes referred to herein as BY6GB) is added and the temperature is raised to 165° C., at which temperature a charge of 0.56 gram of Rhodamine 6GDN Extra and 1.40 grams of Rhodamine B Extra is added together with three drops of 70% phosphorous acid. The reaction mixture is then raised to 175° C. with stirring for ten minutes and the resin mass is dumped. When cooled, the resin mass hardens to form a thermoplastic, friable resin that may be readily reduced to fine particle size by grinding or similar size reducing operations; and the resulting product is a pigment having the characteristic color of the coloring material added thereto, which pigment has been found to be extremely useful in paint (formed with conventional paint vehicles, including film forming alkyds, drying oils, etc.) and in other resinous bodies. For example, the pigment thus formed may be milled into polyethylene (and preferably about 2–3%) to obtain brilliantly colored polyethylene resins that may be used in conventional fabricating operations for polyethylene resins including the formation of sheets, plastic bottles, etc.

DEMONSTRATION W

A pigment resin is made by taking a charge of 158.1 grams of monomethylol dimethyl hydantoin and melting the same with stirring to 120° C.; then adding slowly with stirring 93.5 grams of benzoguanamine. The temperature of the reaction mass is then raised with stirring to 185° C., at which temperature a charge of 2.33 grams of Brilliant Yellow 6G base is added. The temperature is allowed to drop to 160° C., at which temperature a charge of 0.559 gram of Rhodamine 6GDN Extra and 1.398 grams of Rhodamine B Extra is added. Also added at that time is a charge of 4 grams of paraformaldehyde (95%), which is added slowly. The mixture is then heated to 175° C. with stirring and held for about 10 minutes. It was found that the resulting resin has a higher melting point and is more heat stable than the resin of Demonstration V. This resin is also reduced to pigment particle size and is found to be useful for the same purposes described in Demonstration V.

DEMONSTRATION X

The procedures of Demonstrations V and W are repeated, except that the benzoguanamine in each case is replaced by an equivalent molar proportion of formoguanamine (XXXIX), and it is found that comparable results are obtained.

In fact, comparable results are obtained using, instead of the formoguanamine, any of the previously mentioned monoguanamines (XL) through (XLV). In each case the resulting resin has a higher melting point when the paraformaldehyde is added at the latter part of the procedure (as described), thus demonstrating that although a thermoplastic resin may be formed when the formaldehyde component is furnished solely as a prereacted form (i.e., the methylol group on the dimethyl hydantoin), when additional formaldehyde is provided to assist in effecting cocondensation (i.e., for assisting in causing the amino groups of the benzoguanamine to participate in the cocondensation reaction) the melting point of the resin is raised and a more heat stable product is obtained.

Comparable results are also obtained by carrying out Demonstrations V and W using, in place of the molar proportion of the benzoguanamine specified, an amount of adipoguanamine (XLVIII) that is equal to one-half of the molar amount of benzoguanamine employed in Demonstrations V and W. Again, it will be found that the use of the additional paraformaldehyde (in accordance with the procedure of Demonstration W) results in a resin having a higher melting point and greater heat stability. If the amount of additional paraformaldehyde employed is doubled, it will be found that there is still a greater increase in the melting point of the resulting resin. Comparable results are obtained using in place of adipoguanamine any of the other polyguanamines (XLVI) to (LV) hereinbefore described.

DEMONSTRATION Y

A charge of 35 grams of water, 19.5 grams of paraformaldehyde (95%) and 43 grams of ethylene urea is first heated to 90° C. Next, a charge of 46.1 grams of benzoguanamine is added and the reaction mixture is heated to 190° C., at which temperature the reaction mass is maintained until cocondensation is completed as evidenced by the end of bubbling or foaming. Then a charge of 2 grams of Brilliant Yellow 6G base is added and thoroughly dispersed in the reaction mass, which is then allowed to cool to form a friable thermoplastic resin. This material is readily ground to pigment particle size, to obtain a brightly colored pigment which may be used as indicated in Demonstration V herein.

DEMONSTRATION Z

A procedure is carried out that is the same as that described in Demonstration Y, except that the ethylene urea is replaced by an equimolar proportion of hydantoin and comparable results are obtained. Comparable results are also obtained if the same procedure is carried out, except that the hydantoin is replaced by an equimolar proportion of methyl isobutyl hydantoin, and a charge of 10 grams of isopropanol is added to the initial charge to facilitate bringing the methyl isobutyl hydantoin into solution and reaction in the initial charge. Comparable results are obtained if the same procedure is repeated using the corresponding molar proportion of phenylhydantoin in place of the methyl isobutyl hydantoin.

In fact, pigments of comparable brightness and color (although varying melting points) may be obtained by substituting for the phenylhydantoin in the previously mentioned procedure the molar equivalent of each of the various previously mentioned hydantoins (V) through (XVI), although it may be necessary to maintain the initial reaction mass at 90° to 100° C. for a longer period of time in order to obtain substantial homogeneity, before the addition of the benzoguanamine charge and subsequent heating to 190° C. The completion of the reaction would, however, in each instance be evidenced by not only the termination of bubbling or foaming but the formation of a substantially homogeneous reaction mass, which upon cooling (and drying to remove the initial solvent) is a friable resinous solid that may be readily ground to pigment size.

In the practice of the instant invention it has been found that uniquely superior results are obtained if the ingredient (b) is acetylene urea or one of the hereinbefore mentioned compounds of the acetylene urea class (of the class hereinbefore designated (XXIX$a$) through (XXIX$s$) plus acetylene urea itself). Preferably, the ingredient (b) used in the practice of the instant invention will consist substantially entirely of the compounds of the aforesaid acetylene urea class, or at least ingredient (b) will consist of such compounds in a molar ratio of at least 1:5 of such acetylene urea ingredients to any of the other herein specified compounds for ingredient (b). In order to obtain the particular benefits obtained by the use of the acetylene urea type compounds the other compounds of herein specified ingredient (b) will preferably not exceed ⅙ of the molar proportion, or it will not be greater than about 1:5 molar ratio for such other ingredient (b) to the acethylene urea compound for this category. The amount of formaldehyde (a) used in the practice of the invention is that already specified in order to obtain the particular benefit here mentioned relating to improved aging and weathering properties. Also, the aromatic sulfonamide ingredient (d) used in obtaining this particular advantage should be within the molar ranges hereinbefore specified, with a preferred molar range for (a):(b):(d) of substantially 3:1:3. Preferably the range of (b):(d) in this particular instance is, however, within the range of about 1:5 to 5:1.

The polyamino ingredient (c) is not truly optional with respect to the foregoing resinous pigment, since the use of the polyamino compound (c) does facilitate resin formation and in many instances will also apparently result in improvements or at least will apparently help in the resulting improvements obtained in connection with heat and light-stability and resistance to aging and/or weather. The amount of such ingredient (c) used, in order to impart any apparently discernible effect or advantage from the use of such ingredient (c) should be at least about 1:20 in molar ratio of (c):(b) plus (d), and ordinarily the amount of ingredient (c) should otherwise not be sufficient to render the resulting pigment resin thermoset or thermosetting (for the best results in connection with light and heat stability in most instances), or expressed in terms of relatively safe molar proportions the range should be approximately within about 1:20 to about 1:4 or 5 for the molar ratio (c):(b) plus (d), if the amount of formaldehyde used is equal substantially to 1:1 for the molar ratio (a):(b) plus (c) plus (d). If a smaller molar proportion of formaldehyde is used down to approximately 1:2 on the just mentioned molar basis, then the molar proportion of (c):(b) plus (d) may be increased to as much as 1:1 or even 2:1 in specific circumstances, while still obtaining the advantages of the invention just mentioned, and while still obtaining a pigment resin having thermoplastic properties in most instances. The advantages of the thermoplastic properties in the resin include ease of grindability, apparently overall better color characteristics in many instances, and certainly greater ease of inclusion of dyes into the resin system in the later stages of resin formation and/or after initial resin formation.

In connection with inclusion of the coloring material into the resinous pigment systems of the instant invention, it has already been pointed out that the color may be added in a number of different ways. In connection with previously formed pigment color material, e.g., conventional finely divided inorganic pigments which have already been described, the nature and character of the dispersion of such conventional inorganic pigments in the resin matrix which forms the essential body of the pigments of the invention is ordinarily done while the resinous body is in plastic or fluid condition, in the manner hereinbefore described. On the other hand, in connection with the incorporation of dyes as coloring material into the resinous body of the pigments of the instant invention, such dyes are dispersed intimately into the resin body in the form of extremely minute particles, if not in the form of actual molecular dispersions (which latter case is believed to be the fact in most instances).

In many arts the distinction between dye and pigment resides to quite an extent on the theory that the pigment compares generally with the conventional inorganic type of material that is reduced to fine particle size but is not reduced to such size that it can be molecularly dispersed in another pigment matrix such as the synthetic resin matrix here contemplated. In contrast, dyes are ordinarily considered to be capable of initial molecular dispersion in solution ordinarily in some conventional vehicle such as water or some other solvent used in applying the dye to a particular material to be dyed. In this instance, of course, the dye is incorporated in molecular or at least extremely minutely sized particles within the synthetic resin matrix of the individual pigment particles. These dye molecules (or particles of substantially molecular size) are ordinarily incorporated in substantially uniform manner throughout the body of the resin matrix in the pigments of the invention, simply by virtue of the incorporation of the dyes into the resinous material while it is in liquid state or liquefied by an appropriate solvent, e.g., acetone, such that a fine "dispersion" of substantially *solution* characteristics is obtained in the resulting composition of dye and liquefied and/or dissolved pigment resin. As a result, when the resin is solidified the dispersed dye particles undergo minimal agglomeration, if any, and are ordinarily dispersed in the solidified resin body in what appears to be solid solution, if it is not in fact solid solution. If, however, the finely ground synthetic resin pigment particles of the instant invention are to be dyed while in this physical state and they are dyed from a dye bath as shown in previous demonstrations such as U, there will be appreciated that it is altogether possible that the actual centers of the discrete individual synthetic resin pigment particles may not contain the dye particles or molecules in dispersion in the concentrations and/or uniformity of dispersion of a dye in the surface or peripheral portions of such discrete synthetic resin pigment bodies or matrices. But this last result is not of great significance in many instances because the essential function of the dye involves the manner in which it handles incident light and in this respect the dispersed dye in the peripheral portions of each of such pigment particles or bodies will carry out the dominating function.

One aspect of the instant invention which has been found to be significant is that in the previously mentioned preferred synthetic resinous pigment particles (employing the pigment resins which appear to give superior weathering or aging properties) the dyes generally referred to as daylight fluorescent dyes appear to be very satisfactory (when used in the amounts effective for exhibiting daylight fluorescence). In other words, using typical dyes of the type hereinbefore mentioned, in the previously mentioned synthetic resin pigments of the invention (preferably including primarily acetylene urea or its immediately related compounds as ingredient (b) in the resin formation), it has been found that such dyes exhibit unique lasting powers and give unusually superior results in weathering tests, particularly the previously described accelerated weathering test, and this is apparently a result of some unique synergistic effect obtained herein.

It will be understood that modifications and variations may be effected without departing from the spirit and scope of the novel concepts of the present invention.

I claim as my invention:

1. A pigment consisting essentially of a finely divided, synthetic resin and a coloring material dispersed therein; said resin being a cocondensation product of (a) formaldehyde; (b) at least one heterocyclic resin former whose molecule has a plurality of intracyclic —NH— groups each connected to a carbon atom which carbon atom is in turn connected by a double bond to an exocyclic oxygen atom, each such carbon atom being an intracyclic atom in a heterocyclic ring consisting of carbon and nitrogen atoms; (c) at least one substance whose molecule has a plurality of —NH₂ groups each connected to a carbon atom, each such carbon atom being an intracyclic atom that is connected by a double bond to an intracyclic nitrogen atom in a heterocyclic ring consisting of carbon and nitrogen atoms; and (d) at least one aromatic monosulfonamide having two reactive amide hydrogens; the molar ratio of (a):(b) plus (c):(d) ranging from 2:1 to 1:2 and the molar ratio of (b):(d) ranging from 20:1 to 1:20 and the molar ratio of (c):(b) plus (d) ranging from 20:1 to 1:20, said (b), (c) and (d) each being different chemical entities.

2. The pigment of claim 1 wherein (c) is a poly-NH₂ triazine.

3. The pigment of claim 2 wherein (c) is benzoguanamine.

4. The pigment of claim 1 wherein (b) is acetylene diurea.

5. The pigment of claim 1 wherein (b) is dimethylhydantoin.

6. The pigment of claim 1 wherein (b) is acetylene diurea, (c) is melamine, and (d) is toluenesulfonamide, and the molar ratio of (b) plus (c):(d) is substantially 1:1 to 1:5 and the pigment resin is meltable.

7. The pigment of claim 1 wherein the coloring material consists of at least one dye dissolved in the pigment.

8. The pigment of claim 1 wherein the coloring material consists of at least one daylight fluorescent dye in a concentration effective for daylight fluorescence.

9. A pigment consisting essentially of a finely divided, synthetic resin and a coloring material dispersed therein; said resin being a cocondensation product of (a) formaldehyde; (b) at least one heterocyclic resin former whose molecule has a plurality of intracyclic —NH— groups each connected to a carbon atom which atom is in turn connected by a double bond to an exocyclic oxygen atom, each such carbon atom being an intracyclic atom in a heterocyclic ring consisting of carbon and nitrogen atoms; and (c) at least one substance whose molecule has a plurality of —NH₂ groups each connected to a carbon atom, each such carbon atom being an intracyclic atom that is connected by a double bond to an intracyclic nitrogen atom in a heterocyclic ring consisting of carbon and nitrogen atoms; the molar ratio of (a):(b) plus (c) ranging from 2:1 to 1:2 and the molar ratio of (b):(c) ranging from 20:1 to 1:20, said (b) and (c) being different chemical entities.

10. The pigment of claim 9 wherein (c) is a poly-NH₂ triazine.

11. The pigment of claim 10 wherein (c) is melamine.

12. The pigment of claim 9 wherein (b) is dimethylhydantoin.

13. The pigment of claim 9 wherein (b) is acetylene diurea.

14. The pigment of claim 13 wherein (c) is a poly-NH₂ triazine.

15. The pigment of claim 9 wherein (b) is acetylene diurea and (c) is melamine.

16. The pigment of claim 9 wherein the coloring material consists of at least one dye dissolved in the pigment.

17. The pigment of claim 9 wherein the coloring material consists of at least one daylight fluorescent dye in a concentration effective for daylight fluorescence.

18. A pigment consisting essentially of a finely divided, synthetic resin and a coloring material dispersed therein; said resin being a cocondensation product of (a) formaldehyde; (b) at least one heterocyclic resin former whose molecule has a plurality of intracyclic —NH— groups each connected to a carbon atom which carbon atom is in turn connected by a double bond to an exocyclic oxygen atom, each such carbon atom being an intracyclic atom in a heterocyclic ring consisting of carbon and nitrogen atoms; and (d) at least one aromatic monosulfonamide having two reactive amide hydrogens; and the molar ratio of (a):(b) plus (d) ranging from 2:1 to 1:2 and the molar ratio of (b):(d) ranging from 20:1 to 1:20, said (b) and (d) being different chemical entities.

19. The pigment of claim 18 wherein (b) is acetylene diurea.

20. The pigment of claim 18 wherein (b) is dimethylhydantoin.

21. The pigment of claim 18 wherein (b) is acetylene diurea and (d) is toluenesulfonamide.

22. The pigment of claim 18 wherein the coloring material consists of at least one dye dissolved in the pigment.

23. The pigment of claim 18 wherein the coloring material consists of at least one daylight fluorescent dye in a concentration effective for daylight fluorescence.

24. A process of producing a colored pigment comprising producing a resinous cocondensation product, reducing the same to finely divided form, and incorporating a coloring material in the cocondensation product at a stage up to and including its reduction to finely divided form; said product being the heat reaction product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; (c) at least one substance whose molecule has a plurality of NH₂ groups each connected to a carbon atom in a heterocyclic ring, such carbon atom being in turn connected to an intracyclic nitrogen atom by a double bond, and such heterocyclic ring consisting of carbon and nitrogen atoms; and (d) at least one aromatic monosulfonamide having two reactive amide hydrogens; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1, said (b), (c) and (d) each being different chemical entities.

25. The process of claim 24 wherein the coloring material consists of at least one dye for which the cocondensation product has selective absorptivity.

26. The process of claim 25 wherein the cocondensation product is liquefied during such heat-reaction and the coloring material is contacted with such product while so liquefied, and the coloring material consists of at least one daylight fluorescent dye in a concentration effective for daylight fluorescence.

27. The process of claim 26 wherein (b) is acetylene diurea, (c) is melamine, and (d) is toluenesulfonamide, and the molar ratio of (b) plus (c):(d) is substantially 1:1 to 1:5 and the pigment resin is meltable.

28. A process of producing a colored pigment comprising producing a resinous cocondensation product, reducing the same to finely divided form, and incorporating a coloring material in the cocondensation product at a stage up to and including its reduction to finely divided form; said product being the heat reaction product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (c) at least one substance whose molecule has a plurality of $NH_2$ groups each connected to a carbon atom in a heterocyclic ring, such carbon atom being in turn connected to an intracyclic nitrogen atom by a double bond, and such heterocyclic ring consisting of carbon and nitrogen atoms; the molar ratio of (a):(b) plus (c) being 2:1 to 1:2 and the molar ratio of (b):(c) being 20:1 to 1:20, said (b) and (c) being different chemical entities.

29. The process of claim 28 wherein the coloring material consists of at least one dye for which the cocondensation product has selectively absorptivity.

30. The process of claim 29 wherein the cocondensation product is liquefied during such heat-reaction and the coloring material is contacted with such product while so liquefied, and the coloring material consists of at least one daylight fluorescent dye in a concentration effective for daylight fluorescence.

31. The process of claim 30 wherein (b) is acetylene diurea and (c) is melamine.

32. The process of claim 30 wherein (b) is dimethylhydantoin and (c) is benzoguanamine.

33. A process of producing a colored pigment comprising producing a resinous cocondensation product, reducing the same to finely divided form, and incorporating a coloring material in the cocondensation product at a stage up to and including its reduction to finely divided form; said product being the heat reaction product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (d) at least one aromatic monosulfonamide having two reactive amide hydrogens; the molar ratio of (a):(b) plus (d) ranging from 2:1 to 1:2 and the molar ratio of (b):(d) ranging from 20:1 to 1:20, said (b) and (d) being different chemical entities.

34. The process of claim 33 wherein the coloring material consists of at least one dye for which the cocondensation product has selective absorptivity.

35. The process of claim 34 wherein the cocondensation product is liquefied during such heat-reaction and the coloring material is contacted with such product while so liquefied, and the coloring material consists of at least one daylight fluorescent dye in a concentration effective for daylight fluorescence.

36. The process of claim 35 wherein (b) is acetylene diurea and (d) is toluenesulfonamide.

37. A pigmented liquid composition suitable for forming coating films and self-sustaining bodies, consisting essentially of a pigment dispersed as an undissolved, finely divided solid in a substantially transparent liquid vehicle binder which is not a solvent for the pigment and is convertible to a solid state, said pigment consisting substantially of finely divided, substantially cocondensed resin and a coloring material dispersed therein; said resin being the heat reaction product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (d) at least one aromatic monosulfonamide having two reactive amide hydrogens; the molar ratio of (a):(b) plus (d) ranging from 1.5:1 to 1:1, the molar ratio of (b):(d) ranging from 1:20 to 5:1, said (b) and (d) being different chemical entities.

38. The composition of claim 37 wherein the coloring material consists of at least one dye dissolved in the pigment.

39. The composition of claim 38 wherein the coloring material consists of at least one daylight fluorescent dye in a concentration effective for daylight fluorescence.

40. The composition of claim 39 wherein (b) is dimehtylhydantoin and (d) is toluenesulfonamide.

41. The composition of claim 39 wherein (b) is acetylene diurea and (d) is toluenesulfonamide.

42. A pigmented liquid composition suitable for forming coating films and self-sustaining bodies, consisting essentially of a pigment dispersed as a undissolved, finely divided solid in a substantially transparent liquid vehicle binder which is not a solvent for the pigment and is convertible to a solid state, said pigment consisting substantially of finely divided, substantially cocondensed resin and a coloring material dispersed therein; said resin being the heat reaction product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms, (c) at least one substance whose molecule has a plurality of $NH_2$ groups each connected to a carbon atom in a heterocyclic ring, such carbon atom being in turn connected to an intracyclic nitrogen atom by a double bond, and such heterocyclic ring consisting of carbon and nitrogen atoms; and (d) at least one aromatic monosulfonamide having two reactive amide hydrogens; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1, said (b), (c) and (d) each being different chemical entities.

43. The composition of claim 42 wherein the coloring material consists of at least one dye dissolved in the pigment.

44. The composition of claim 43 wherein the coloring material consists of at least one daylight fluorescent dye in a concentration effective for daylight fluorescence.

45. The composition of claim 44 wherein (b) is acetylene diurea, (c) is melamine, and (d) is toluenesulfonamide, and the molar ratio of (b) plus (c):(d) is substantially 1:1 to 1:5 and the pigment resin is meltable.

46. A pigmented liquid composition suitable for forming coating films and self-sustaining bodies, consisting essentially of a pigment dispersed as an undissolved, finely divided solid in a substantially transparent liquid vehicle binder which is not a solvent for the pigment and is convertible to a solid state, said pigment consisting substantially of finely divided, substantially co-condensed resin and a coloring material dispersed therein; said resin being the heat reaction product of (a) formaldehyde; (b) at least one heterocyclic resin former whose molecule has a plurality of intracycle —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (c) at least one substance whose molecule has a plurality of $NH_2$ groups each connected to a carbon atom in a heterocyclic ring, such carbon atom being in turn connected to an intracyclic nitrogen atom by a double bond, and such heterocyclic ring consisting of carbon and nitrogen atoms; the molar ratio of (a):(b) plus (c) ranging from 2:1 to 1:2 and the molar ratio of (c):(b) ranging from 1:20 to 20:1, said (b) and (c) being different chemical entities.

47. The composition of claim 46 wherein the coloring material consists of at least one dye dissolved in the pigment.

48. The composition of claim 47 wherein the coloring material consists of at least one daylight fluorescent dye in a concentration effective for daylight fluorescence.

49. The composition of claim 48 wherein (b) is acetylene diurea and (c) is melamine.

50. The composition of claim 48 wherein (b) is dimethylhydantoin and (c) is benzoguanamine.

51. A pigment consisting essentially of a finely divided, substantially completely cocondensed resin and a coloring material dispersed therein; said resin being the heat reaction product of (a) formaldehyde; (b) dimethyl hydantoin, (c) melamine, and (d) toluenesulfonamide; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1.

52. A pigment consisting essentially of a finely divided, substantially completely cocondensed resin and a coloring material dispersed therein; said resin being the heat reaction product of (a) formaldehyde, (b) dimethyl hydantoin, and (c) benzoguanamine; the molar ratio of (a):(b) plus (c) ranging from 2:1 to 1:2 and the molar ratio of (c):(b) ranging from 1:20 to 20:1.

53. A pigment consisting essentially of a finely divided, substantially cocondensed resin and a coloring material dispersed therein; said resin being the heat reaction product of (a) formaldehyde, (b) dimethyl hydantoin and (d) toluenesulfonamide; the molar ratio of (a):(b) plus (d) ranging from 1.5:1 to 1:1, the molar ratio of (b):(d) ranging from 1:20 to 5:1.

54. A process of producing a colored pigment comprising producing a resinous cocondensation product, reducing the same to finely divided form, and incorporating a coloring material in the cocondensation product at a stage up to and including its reduction to finely divided form; said product being the heat reaction product of (a) formaldehyde, (b) dimethyl hydantoin, (c) melamine, and (d) toluenesulfonamide; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1.

55. A process of producing a colored pigment comprising producing a resinous cocondensation product, reducing the same to finely divided form, and incorporating a coloring material in the cocondensation product at a stage up to and including its reduction to finely divided form; said product being the heat reaction product of (a) formaldehyde, (b) dimethyl hydantoin and (d) toluenesulfonamide; the molar ratio of (a):(b) plus (d) ranging from 1.5:1 to 1:1, the molar ratio of (b):(d) ranging from 1:20 to 5:1.

56. A method of producing resin that comprises heating together in a fluid reaction mass to effect substantially complete cocondensation of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; (c) at least one substance whose molecule has a plurality of NH₂ groups each connected to a carbon atom in a heterocyclic ring, such carbon atom being in turn connected to an introcyclic nitrogen atom by a double bond, and such heterocyclic ring consisting of carbon and nitrogen atoms; and (a) at least one aromatic monosulfonamide having two reactive hydrogens attached to nitrogen in its molecule; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1, said ingredients (b), (c) and (d) being different chemical entities.

57. A method of producing resin that comprises heating together in a fluid reaction mass to effect substantially complete cocondensation of (a) formaldehyde, (b) dimethyl hydantoin, (c) benzoguanamine and (d) toluenesulfonamide; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1.

58. A cocondensation product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; (c) at least one substance whose molecule has a plurality of NH₂ groups each connected to a carbon atom in a heterocyclic ring, such carbon atom being in turn connected to an intracyclic nitrogen atom by a double bond, and such heterocyclic ring consisting of carbon and nitrogen atoms; and (d) at least one aromatic monosulfonamide having two reactive hydrogens attached to nitrogen in its molecule; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1, said ingredients (b), (c) and (d) being different chemical entities.

59. A thermoplastic cocondensation product of (a) formaldehyde, (b) dimethyl hydantoin, (c) melamine, and (d) toluenesulfonamide; the molar ratio of (a):(b) plus (c) plus (d) ranging from 2:1 to 1:2, the molar ration of (b):(d) ranging from 1:20 to 20:1, the molar ratio of (c):(b) plus (d) ranging from 1:20 to 20.1.

60. A cocondensation product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (d) at least one aromatic monosulfonamide having two reactive hydrogens attached to nitrogen in its molecule; the molar ratio of (a):(b) plus (d) ranging from 1.5:1 to 1:1, the molar ratio of (b):(d) ranging from 1:20 to 5:1, said ingredients (b) and (d) being different chemical entities.

61. A thermoplastic cocondensation product of (a) formaldehyde, (b) dimethyl hydantoin and (d) toluenesulfonamide; the molar ratio of (a):(b) plus (d) ranging from 1.5:1 to 1:1, the molar ratio of (b):(d) ranging from 1:20 to 5:1.

62. A method of producing resin that comprises heating together in a fluid reaction mass to effect substantially complete cocondensation of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (d) at least one aromatic monosulfonamide having two reactive hydrogens attached ton itrogen in its molecule; the molar ratio of (a):(b) plus (d) ranging from 1.5:1 to 1:1, the molar ratio of (b):(d) ranging from 1:20 to 5:1, said ingredients (b) and (d) being different chemical entities.

63. A method of producing resin that comprises heating together in a fluid reaction mass to effect substantially complete cocondensation of (a) formaldehyde, (b) dimethyl hydantoin and (d) toluenesulfonamide; the molar ratio of (a):(b) plus (d) ranging from 1.5:1 to 1:1, the molar ratio of (b):(d) ranging from 1:20 to 5:1.

64. A process of producing a colored pigment comprising producing a resinous cocondensation product, reducing the same to finely divided form, and incorporating a coloring material in the cocondensation product at a stage up to and including its reduction to finely divided form; said product being the heat reaction product of (a) formaldehyde, (b) dimethyl hydantoin, and (c) benzoguanamine; the molar ratio of (a):(b) plus (c) ranging from 2:1 to 1:2 and the molar ratio of (c):(b) ranging from 1:20 to 20:1.

65. A process of producing a colored pigment comprising producing a resinous cocondensation product, reducing the same to finely divided form, and incorporating a coloring material in the cocondensation product at a stage up to and including its reduction to finely divided form; said product being the heat reaction product of (a) formaldehyde, (b) dimethyl hydantoin, and (c) melamine; the molar ratio of (a):(b) plus (c) ranging from 2:1 to 1:2 and the molar ratio of (c):(b) ranging from 1:20 to 20:1.

66. A pigment consisting essentially of a finely divided, substantially completely cocondensed resin and a coloring material dispersed therein; said resin being the heat reaction product of (a) formaldehyde, (b) dimethyl hydantoin, and (c) melamine; the molar ratio of (a):(b) plus (c) ranging from 2:1 to 1:2 and the molar ratio of (c):(b) ranging from 1:20 to 20:1.

67. The pigment of claim 52 wherein the coloring material therein is at least one daylight fluorescent dye in an amount effective for daylight fluorescence.

68. The pigment of claim 66 wherein the coloring material therein is at least one daylight fluorescent dye in an amount effective for daylight fluorescence.

69. The pigment of claim 51 wherein the coloring material therein is at least one daylight fluorescent dye in an amount effective for daylight fluorescence.

70. The pigment of claim 53 wherein the coloring material therein is at least one daylight fluorescent dye in an amount effective for daylight fluorescence.

71. A method of producing resin that comprises heating together in a fluid reaction mass to effect substantially complete cocondensation of (a) formaldehyde, (b) acetylene urea, (c) benzoguanamine and (d) toluenesulfonamide; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1.

72. A cocondensation product of (a) formaldehyde, (b) acetylene urea, (c) melamine, and (d) toluenesulfonamide; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1.

73. A cocondensation product of (a) formaldehyde, (b) acetylene urea and (d) toluenesulfonamide; the molar ratio of (a):(b) plus (d) ranging from 1.5:1 to 1:1, the molar ratio of (b):(d) ranging from 1:20 to 5:1.

74. A method of producing resin that comprises heating together in a fluid reaction mass to effect substantially complete cocondensation of (a) formaldehyde, (b) acetylene urea and (d) toluenesulfonamide; the molar ratio of (a):(b) plus (d) ranging from 1.5:1 to 1:1, the molar ratio of (b):(d) ranging from 1:20 to 5:1.

75. A method of producing resin that comprises heating together in a fluid reaction mass to effect substantially complete cocondensation of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; (c) at least one substance whose molecule has a plurality of NH$_2$ groups each connected to a carbon atom in a heterocyclic ring, such carbon atom being in turn connected to an intracyclic nitrogen atom by a double bond, and such heterocyclic ring consisting of carbon and nitrogen atoms; and (d) at least one aromatic monosulfonamide having two reactive hydrogens attached to nitrogen in its molecule; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1, said ingredients (b), (c) and (d) being different chemical entities, and the molar ratio of polycyclic-ureido resin former to any other resin former of ingredient (b) being at least 1:5.

76. A method of producing resin that comprises heating together in a fluid reaction mass to effect substantially complete cocondensation of (a) formaldehyde; (b) at least one heterocyclic ring former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (c) at least one substance whose molecule has a plurality of NH$_2$ groups each connected to a carbon atom in a heterocyclic ring, such carbon atom being in turn connected to an intracyclic nitrogen atom by a double bond, and such heterocyclic ring consisting of carbon and nitrogen atoms; the molar ratio of (a):(b) plus (c) ranging from 2:1 to 1:2, the molar ratio of (c):(b) ranging from 1:20 to 20:1, said ingredients (b) and (c) being different chemical entities, and the molar ratio of polycyclic-ureido resin former to any other resin former of ingredient (b) being at least 1:5.

77. A method of producing resin that comprises heating together in a fluid reaction mass to effect substantially complete cocondensation of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (d) at least one aromatic monosulfonamide having two reactive hydrogens attached to nitrogen in its molecule; the molar ratio of (a):(b) plus (d) ranging from 1.5:1 to 1:1, the molar ratio of (b):(d) ranging from 1:20 to 5:1, said ingredients (b) and (d) being different chemical entities, and the molar ratio of polycyclic-ureido resin former to any other resin former of ingredient (b) being at least 1:5.

78. A cocondensation product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (d) at least one aromatic monosulfonamide having two reactive hydrogens attached to nitrogen in its molecule; the molar ratio of (a):(b) plus (d) ranging from 1.5:1 to 1:1, the molar ratio of (b):(d) ranging from 1:20 to 5:1, said ingredients (b) and (d) being different chemical entities, and the molar ratio of polycyclic-ureido resin former to any other resin former of ingredient (b) being at least 1:5.

79. A cocondensation product of (a) formaldehyde; (b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; (c) at least one substance whose molecule has a plurality of NH$_2$ groups each connected to a carbon atom in a heterocyclic ring, such carbon atom being in turn connected to an intracyclic nitrogen atom by a double bond, and such heterocyclic ring consisting of carbon and nitrogen atoms; and (d) at least one aromatic monosulfonamide having two reactive hydrogens attached to nitrogen in its molecule; the molar ratio of (a):(b) plus (c) plus (d) ranging from 2:1 to 1:2, the molar ratio of (b):(d) ranging from 1:20 to 20:1, the molar ratio of (c):(b) plus (d) ranging from 1:20 to 20:1, said ingredients (b), (c) and (d) being different chemical entities, and the molar ratio of polycyclic-ureido resin former and any other resin former of ingredient (b) being at least 1:5.

80. A cocondensation product of (a) formaldehyde;

(b) at least one heterocyclic resin former whose molecule has a plurality of intracyclic —NH— groups each connected to a carbon atom in a heterocyclic ring, such carbon atom being in turn connected to an oxygen atom by a double bond, and such heterocyclic ring being a five-membered ring consisting of carbon and nitrogen atoms; and (c) at least one substance whose molecule has a plurality of $NH_2$ groups each connected to a carbon atom in a heterocyclic ring, such carbon atom being in turn connected to an intracyclic nitrogen atom by a double bond, and such heterocyclic ring consisting of carbon and nitrogen atoms; the molar ratio of (a):(b) plus (c) ranging from 2:1 to 1:2, the molar ratio of (c):(b) ranging from 1:20 to 20:1, said ingredients (b) and (c) being different chemical entities, and the molar ratio of polycyclic-ureido resin former and any other resin former of ingredient (b) being at least 1:5.

References Cited

UNITED STATES PATENTS

| | | | |
|---|---|---|---|
| 2,155,863 | 4/1939 | Jacobson | 260—45.1 |
| 2,368,451 | 1/1945 | DiAlelio | 260—67.6 |
| 2,635,083 | 4/1953 | Cordier | 260—67.5 |
| 2,804,402 | 8/1957 | Williams | 260—67.5 |
| 2,809,954 | 10/1957 | Kazenas | 252—301.2 XR |
| 2,929,798 | 3/1960 | Wayland et al. | 260—67.6 |
| 2,938,873 | 5/1960 | Kazenas | 252—301.2 |
| 2,955,057 | 10/1960 | Gagliardi | 260—67.5 |

HELEN M. McCARTHY, Primary Examiner.

R. D. EDMONDS, Assistant Examiner.

UNITED STATES PATENT OFFICE
CERTIFICATE OF CORRECTION

Patent No. 3,412,036               November 19, 19(

Maurice Dwight McIntosh

It is certified that error appears in the above identified patent and that said Letters Patent are hereby corrected as shown below:

Column 2, line 63, "to" should read -- of --. Column 5, lines 50 to 55, before "(XXVIa)" insert -- Typical compounds include: --. Column 8, line 45, "7,8-d methyl" should read -- 7,8-dimethyl --. Column 11, formula (XXXIV) should appear as shown below:

(XXXIV)   1-guanyl guanazole

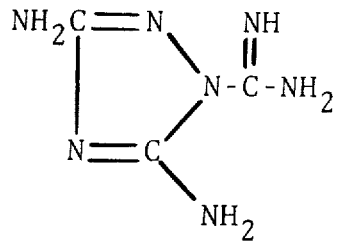

same column 11, lines 69 to 75, the formula should appear as shown below:

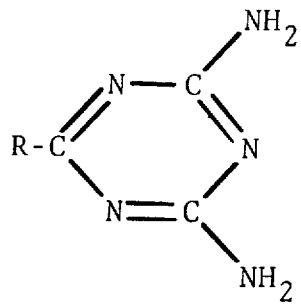

Column 12, formula (XLI) should appear as shown below:

(XLI) Propioguanamine

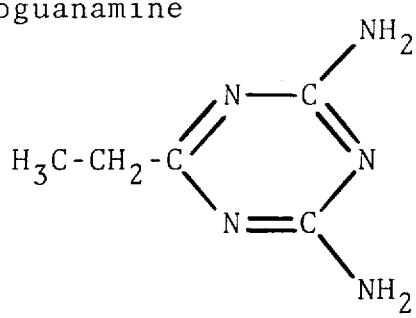

Column 14, line 72, "an" should read -- a --. Column 16, line 21, "biguadine" should read -- biguanide --; line 74, "upto" should read -- up to --. Column 17, line 22, "frabricating" should read -- fabricating --. Column 19, line 56, before "C-8" insert -- Run --. Column 20, line 34, after "portion" insert -- of --. Column 24, line 5, "outline" should read -- outlined --. Column 25, line 15, "pigments" should read -- pigment --. Column 27, line 14, "emthyl" should read -- methyl --. Column 29, line 19, "suc has" should read -- such as --. Column 31, line 28, "acethylene" should read -- acetylene --. Column 33, line 47, after "which" insert -- carbon --. Column 35, line 11, "selectively" should read -- selective --. Column 36, line 3, "mehtylhydantoin" should read -- methylhydantoin --; line 8, "a" should read -- an --. Column 36, line 54, "intracycle" should read -- intracyclic --. Column 37, line 59, "introcyclic" should read -- intracyclic --; line 61, "(a)" should read -- (d) --. Column 38, line 24, "ration" should read -- ratio --; line 54, "ton itrogen" should read -- to nitrogen --. Column 39, line 13, "melamide" should read -- melamine --.

Signed and sealed this 9th day of June 1970.

(SEAL)
Attest:

EDWARD M. FLETCHER, JR.
Attesting Officer

WILLIAM E. SCHUYLER, JR
Commissioner of Patents